US010845620B2

(12) United States Patent
Shtukater

(10) Patent No.: US 10,845,620 B2
(45) Date of Patent: Nov. 24, 2020

(54) SMART CONTACT LENS

(71) Applicant: Aleksandr Shtukater, Fair Lawn, NJ (US)

(72) Inventor: Aleksandr Shtukater, Fair Lawn, NJ (US)

(*) Notice: Subject to any disclaimer, the term of this patent is extended or adjusted under 35 U.S.C. 154(b) by 471 days.

(21) Appl. No.: 14/963,241

(22) Filed: Dec. 9, 2015

(65) Prior Publication Data

US 2016/0299354 A1    Oct. 13, 2016

Related U.S. Application Data

(60) Provisional application No. 62/089,134, filed on Dec. 8, 2014.

(51) Int. Cl.
*G02C 7/02* (2006.01)
*G02C 7/04* (2006.01)

(52) U.S. Cl.
CPC ..................... *G02C 7/04* (2013.01)

(58) Field of Classification Search
CPC . G02C 7/04; G02C 7/08; G02C 7/083; G02C 7/101; G02C 7/041; G02C 7/042; G02C 7/049; G02C 7/081; G02C 7/10; G02C 2202/12; G02C 2202/14; G02F 2001/294
USPC .................................... 351/159.03
See application file for complete search history.

(56) References Cited

U.S. PATENT DOCUMENTS

| 6,447,449 | B1  | 9/2002  | Fleischman et al. |
| 6,579,235 | B1  | 6/2003  | Abita et al. |
| 6,749,568 | B2  | 6/2004  | Fleischman et al. |
| 7,169,106 | B2  | 1/2007  | Fleischman et al. |
| 7,639,845 | B2  | 12/2009 | Utsunomiya |
| 8,241,574 | B2  | 8/2012  | Burles et al. |
| 8,336,387 | B2  | 12/2012 | Tai et al. |
| 8,385,998 | B2  | 2/2013  | Zhang |
| 8,857,981 | B2  | 10/2014 | Pletcher et al. |
| 8,864,305 | B2  | 10/2014 | Pletcher et al. |
| 8,870,370 | B1  | 10/2014 | Otis et al. |
| 8,960,898 | B1* | 2/2015  | Etzkorn ............... G02C 7/049 351/159.03 |
| 8,960,899 | B2  | 2/2015  | Etzkorn |
| 8,965,478 | B2  | 2/2015  | Liu |

(Continued)

OTHER PUBLICATIONS

U.S. Appl. No. 13/780,135, filed Aug. 28, 2014, Johnson & Johnson Vision Care, Inc.

*Primary Examiner* — William R Alexander
*Assistant Examiner* — Henry A Duong

(57) ABSTRACT

The smart contact lens system hereby proposed, integrates a number of electronic, electro-optical or optical components on the contact lens substrate. The system, inter alia, is arranged to identify and track changes in pupillary response due to mental task engagement, also known as task-evoked pupillary response. To this end, the system proposed tracks a variety of conditions affecting reflexes such as pupillary reflex or accommodation reflex, in order to compute the extent of pupil dilation attributable to the mental task engagement. Another aspect of present invention is a smart contact lens system, which minimizes pupillary reflex caused by light by controlling the amount of light entering the eye. When pupillary reflex is non-existent, computing a task-evoked pupillary response becomes a much easier task.

19 Claims, 14 Drawing Sheets

(56) References Cited

U.S. PATENT DOCUMENTS

| | | |
|---|---|---|
| 8,971,978 B2 | 3/2015 | Ho et al. |
| 8,979,271 B2 | 3/2015 | Pletcher et al. |
| 8,985,763 B1 | 3/2015 | Etzkorn et al. |
| 8,986,240 B2 | 3/2015 | Dos Santos et al. |
| 8,989,834 B2 | 3/2015 | Ho et al. |
| 9,047,512 B2 | 6/2015 | Otis et al. |
| 9,054,079 B2 | 6/2015 | Etzkorn |
| 9,055,902 B2 | 6/2015 | Liu |
| 9,063,351 B1 | 6/2015 | Ho et al. |
| 9,111,473 B1 | 8/2015 | Ho et al. |
| 9,113,829 B2 | 8/2015 | Etzkorn |
| 9,125,721 B2 | 9/2015 | Field |
| 9,155,653 B2 | 10/2015 | Field |
| 9,158,133 B1 | 10/2015 | Pletcher et al. |
| 9,161,712 B2 | 10/2015 | Etzkorn |
| 9,176,332 B1 | 11/2015 | Etzkorn et al. |
| 9,184,698 B1 | 11/2015 | Wiser et al. |
| 2004/0027536 A1* | 2/2004 | Blum ............... B29D 11/00826 351/159.03 |
| 2006/0173497 A1 | 8/2006 | Mech |
| 2008/0208335 A1 | 8/2008 | Blum |
| 2010/0113901 A1 | 5/2010 | Zhang |
| 2013/0211285 A1* | 8/2013 | Fuller .................. A61B 3/16 600/561 |
| 2014/0098226 A1* | 4/2014 | Pletcher .................. H04N 7/18 348/143 |
| 2014/0186806 A1* | 7/2014 | Hallowell .............. A61B 3/112 434/167 |

\* cited by examiner

SMART CONTACT LENS

BACKGROUND OF AN INVENTION

Throughout centuries people deemed the eye and more specifically, the pupil of the eye to be a figurative mirror of and a "window to the soul", connoting that eyes can tell a lot about the "state" of thoughts, emotions, the subconscious, and could reveal the content of the mind at any given time. There has been a good amount of research done in the second half of the 20$^{th}$ century and is currently performed on the subject. The latest research supports the preamble that the eyes and, more specifically, changes in pupil diameter, resulting from pupil dilation (Mydriasis) or pupil constriction (Miosis), are reflective and predictive of the state of mind within a specific context of evaluation.

Present invention is predicated by the following statement by a great German psychiatrist and neurologist Oswald Bumke in 1911:

"Every active intellectual process, every psychical effort, every exertion of attention, every active mental image, regardless of content, particularly every affect just as truly produces pupil enlargement as does every sensory stimulus".

There is research which concentrated on correlating both attentional effort and processing activities to pupillary dilation response. In this field, research of Beatty (1982, 1986) and Goldwater (1972) is particularly interesting. The research definitively showed strong correlation between attentional effort and dilation response.

Some of the research has been concentrated on the correlation of mental effort and pupil dilation response. Remarkable studies were conducted by Metalis, Rhoades, Hess and Petrovich (1980). In their research, among other things, pupil dilation was analyzed with respect to arithmetic problems of different levels of complexity. A variety of mental efforts have been looked at to examine stress paradigm. Also, pupil dilation was studied with respect to language processing tasks such as reading text forwards and backwards. In all cases, research shows a strong correlation between mental activity and pupillary response.

Lowenstein and Loewnfeld (1964) reported that pupil diameter is maximal in a well-rested individual, decreases with fatigue and reaches maximum diameter as the subject is about to go into sleep. Geacintov and Peavler (1974) ran experiments to observe pupillary response to fatigue and tiredness of phone operators at work. They identified positive and consistent correlation between pupillary dilation and fatigue.

Furthermore, research done by Karatekin and Verney on pupillary motility, studied the correlation between cognitive tasks, normal cognition and pupillary response. Strong correlation has been identified between an increase in complexity of mental tasks and the extent of pupil dilation. When familiar tasks were performed, dilation was remarkably smaller than dilation observed when subjects were engaged in less familiar tasks.

Moreover, research by Kahneman and Beatty established a strong correlation between memory load (the amount of data to be memorized) and pupillary dilation. They've tested subjects for memorization of a variety of numbers with increasing number of digits per number. They observed consistent pupillary effect. As the number of digits increased in each number, the level of pupillary response increased accordingly. Poock and Granholm et al did remarkable research on memorization at maximum memory capacity levels and the effect of overloading the subject's memory capacity. With each increase in the amount of information leading up to maximum memory capacity, pupillary response increased proportionally. However, with an additional increase of information fed to the subject for memorization, beyond the assumed memory capacity, there was a negative dilation—pupil constriction was observed.

Plenty of research has been done with consistent results on the positive relationship between sexual arousal/attraction and pupil dilation. In 1970s, Canadian government used pupil dilation to determine which of the government employees had untraditional sexual orientation. The study relied on pupil dilation monitors that observed the subject's pupillary response to visual stimuli—pictures of attractive models of both genders. Even though the system used for testing was somewhat faulty and did not account for a number of factors, the underlying assumption about pupil dilation response to visual stimuli of pictures of nude men and women was correct.

There is research that shows that once the human brain makes a decision, for example, to raise an arm, or to move a computer mouse, the pupil dilates for a duration of 0.5 s to a second before the action is actually taken. Hence, detecting the moment when decision-making takes place and identifying what it is, may be used for human—computer interfacing.

Scientific etiology of pupil dilation and constriction illustrates that pupil dilation and constriction are highly reflective of and strongly correlated with a number of psychological and psychophysical activities/processes. Research shows that pupil dilation may be prompted by a variety of cognitive tasks, such as attentional allocation, stimulus identification, response organization, working memory maintenance, semantic elaboration, motor output or by a variety of emotional processing, such as interpretation of affective valence.

Presently, a variety of pupillometric methods are used to measure variations in the diameter of the pupillary aperture of the eye in response to psychophysical and/or psychological stimuli.

The majority of currently available pupillometric measurement systems rely on video image capture coupled with an infrared light emitter. When infrared light illuminates the eye, it is reflected by the retina more efficiently than by the cornea (same effect as red-eye effect in photography). An image is analyzed then for the presence of bright retinal reflection of infrared light—it is easy to analyze the size of the bright spot thereby produced. Pupil diameter is determined with a foreshortening division, which accounts for the distance between the pupil and the camera.

Some typical pupil tracking tools are SMI iView X, Polhemus VisionTrak Standard Head Mounted Eye Tracking System, Whittaker TV Pupillometer, etc.

Currently available solutions for pupillometric measurement and tracking involve an observer tool, which is external to the subject, such as a video camera. Also, in most cases, observation is performed under controlled light conditions and controlled distance to the object being looked at, to ensure the same depth of focus. Existing systems try to isolate mental stimuli to make sure that pupillary changes are fully due to mental stimuli.

Thus, it is deemed beneficial to remove a dependency on external observer tools and liberate from the need to keep other factors "Ceteris paribus". Current invention proposes integrating a pupil dilation sensor into the contact lens substrate and coupling it with a variety of sensors to detect and track other factors that may affect pupillary response.

Integrating a pupil dilation sensor into the contact lens enables continuous monitoring of pupillary response to a variety of real-time stimuli. Pupillary response may be observed while the subject is awake or asleep. Embedding pupil dilation sensor into the contact lens and combining it with a variety of sensors which allow to identify and track other factors affecting pupil diameter, as well as, tracking mental context, provide an opportunity to determine attitude and disposition to the current context in a variety of conditions and situations. Provided that the context of pupil dilation/constriction may be isolated and clearly determined, the dilation process can be used deterministically in a variety of applications. Thus, real-time tracking/monitoring of the pupil and evaluating pupil diameter changes in a particular context of engagement is highly useful and beneficial for a manifold of applications. Such applications, inter alia, may include: reactive, predictive, adaptive, tracking, behavior recording and analyzing applications, and other types of applications.

In general, the physiology of pupillary response is as follows: there are two types of muscles involved in pupil dilation and control of the size of an iris: the iris sphincter, which consists of circularly structured muscle fibers, and the iris dilator, which consists of radially structured muscle fibers. The sphincter is innerved by the parasympathetic system. The iris dilator muscles are innerved by the sympathetic nervous system.

Radial dilator muscles of the pupil are stimulated by the activation of the sympathetic system. The iris sphincter muscles are stimulated by the activation of the parasympathetic system. With the stimulation of the parasympathetic system, with the efferent pathway originating in the Edinger-Westphal complex of the oculomotor nucleus, the sphincter muscles of the iris constrict the pupil.

DETAILED DESCRIPTION OF DRAWINGS

The drawings, in which like numerals represent similar parts, illustrate generally, by way of example, but not by way of limitation, various embodiments discussed in the present document.

DETAILED EMBODIMENTS

Figure 1:
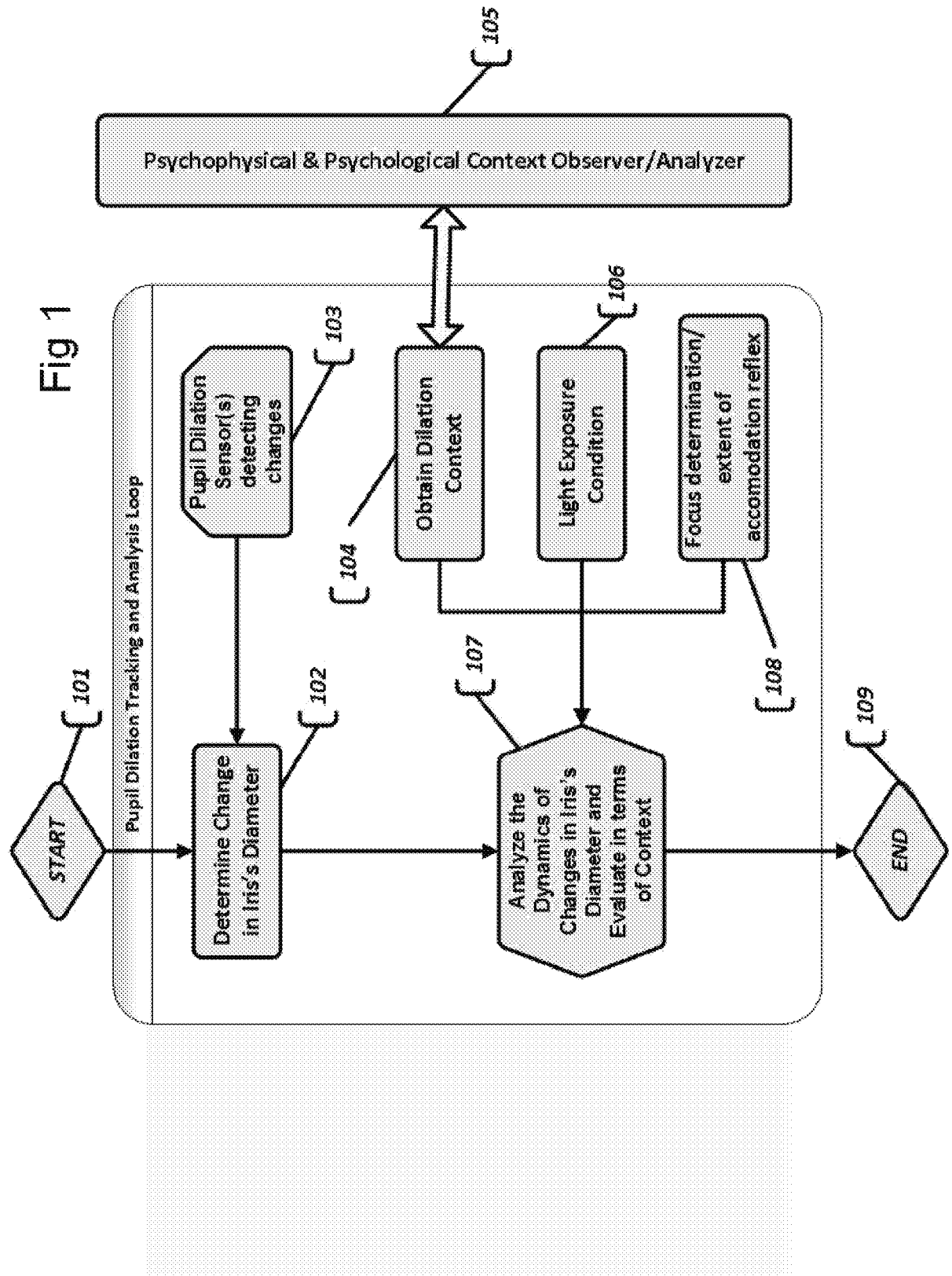
FIG. 1 is a process flow diagram, describing the flow of detection of iris constriction vs dilation, simultaneous determination of context, and consequent analysis of the significance of the iris diameter change in light of the present invention.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

The various embodiments and/or components, for example, the modules, elements, or components and controllers therein, also may be implemented as part of one or more computers or processors. The computer or processor may include a computing device, an input device, a display unit and an interface, for example, for accessing the Internet or Intranet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" or "component" may include any processor-based or microprocessor-based system including systems using microcontrollers, reduced instruction set computers (RISC), application specific integrated circuits (ASICs), fieldprogrammable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer". In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

For the purposes of this patent application the terms "pupil dilation component" and "pupil dilation module" are synonymous. Pupil dilation module may comprise "pupil dilation sensor".

For the purposes of this patent application, terms "ambient light determination component" and "ambient light determination module" are synonymous.

For the purposes of this patent application, terms "accommodation reflex determination component" and "accommodation reflex determination module" are synonymous.

For the purposes of this patent application, the term "light sensor" refers to an electromagnetic energy sensor capable of detecting and measuring a variety of ranges of electromagnetic spectrum. The term "light sensor" may refer to luminescence, light, glare, photoluminescence, or infrared light sensors.

For the purposes of this patent application, the term "application" may refer to a software program.

FIG. 1 depicts the process flow and operation of the system, as per current invention. The process starts at 101, for example, by a voice command or by pressing a button on a smart phone to start the operation of the system or by a predefined series of eye blinks (denoting activation of the process). At step 102, the process determines the current dilation of the pupil or change in iris diameter, utilizing a pupil dilation sensor or a group of sensors 103, embedded into the substrate of the contact lens. Furthermore, as per exemplary, non-limiting embodiment, at step 105 the system may monitor for a variety of aspects of psychophysical and psychological state of the subject (the wearer of the active contact lens). These psychophysical and psychological/mental states form the context of the system, in which pupil dilation may be evaluated at any given time.

In one exemplary, non-limiting embodiment, at step 105, an application that engages the subject at any given time, may postulate and track the context for the evaluation of pupil diameter changes. Such an application may be executing on any form of smart device, such as, smart phone, wearable device or the contact lens itself, or an application may be executed by a remotely situated processing device or module.

It will be appreciated by the persons skilled in the art, that there is a variety of methods, algorithms and systems available that allow tracking, monitoring and analyzing of the psychophysical or/and psychological state of the subject.

For example, a hypothetical, versatile, psychophysical and psychological state tracker system may intake any combination of the following, but not being limited to the following: a) images/video from an image capture device(s) showing what the tracked subject is looking at; b) audio data from an audio tracker device that tracks the content of the conversation/monologue where the subject is involved; c) a variety of "on the body" physiology tracking sensors, which working in parallel, may be tracking heart rate, diastolic or systolic blood pressure, body temperature. Such a system may track a variety of hormones in the blood stream or in bodily tissues, level of glucose, etc.; d) the system may also track brain activity of the subject. The analyzer of such a system will analyze the mental state, as well as, physiological state of the subject, and will correlate it to the set of observed inputs. The analyzer of such a system may utilize NLP (Natural Language Processing) AI (Artificial Intelligence) capability like IBM Watson, with deep NLP capability to understand speech/text. The analyzer may have an image/video processor with object recognition technology. The analyzer may use, for example, a variety of AI methods, such as computational neural network, non-monotone thinking techniques to evaluate the subject's environment. The analyzer may use, for example, a variety of stochastic, non-deterministic and probabilistic models to determine the context. The system may take into account physiological parameters observed and so on. The system may take into account the gender of the subject being tracked or evaluated. The system may take into account the level of luminosity around the user and distance to objects the user is looking at.

The primary function of the psychophysical and psychological state tracker is to determine the mental context of subject's mental or physiological engagement. Such tracker system may be able to answer questions such as what is the subject looking at; or what is the subject listening to, leading up to the more fundamental question: what are his current mental or physiological tasks.

It should be understood that any combination of above mentioned components of the psychophysical and psychological state(s) tracker system may be used. For example, only image/video analysis may be performed, or only audio analysis may be performed, or both to determine the context for evaluation.

Thus, at the step 104, the system determines the context of the psychological (mental) or physiological or psychophysiological states or a combination thereof. In one exemplary, non-limiting embodiment, step 104 may involve, an application, which engages the user and defines the specific context for evaluation. For example, adaptive learning software may define the context to be memorization, or mental analysis, or both. In this exemplary embodiment, the system would adjust the amount of information and/or complexity based on the subject's pupillary response. Alternatively, for example, adaptive game software may define the context as a combination of intensity and/or difficulty of the game. In this exemplary embodiment, the system would adjust intensity or/and difficulty level of the game in proportion to the pupillary response of the subject. Another example is a dating application, which may present to the subject a photograph or a video recording of a prospective candidate and monitor for pupil diameter changes. The context for evaluation would be a candidate's outward appearance and may include the voice of the candidate. In this exemplary embodiment, the system could learn from the subject's pupillary response to viewing a multitude of photos/videos of candidates. The system would then do a more directed search for candidates with features that receive positive feedback in the subject in terms of pupillary response.

In one non-limiting, exemplary embodiment, the application dictates and defines the context for evaluation.

There are a number of different unconditioned reflexes that heavily weigh in and may separately or jointly contribute to pupil dilation/constriction. Most significant reflexes, which may need to be factored in, are accommodation reflex and Pupillary Light Reflex (PLR). In fact, most significant changes in pupil diameter occur due to the accommodation reflex and Pupillary Light Reflex (PLR). In general, the pupil of a human eye can constrict up to 1.5 mm in diameter and dilate to about 8-9 mm. It can react to stimuli in 0.2 s, with response generally peaking in 0.5-1.0 s. (Guyton 1977; Lowenstein & Loewenfeld, 1962). Smaller changes in pupil diameter, usually less then 0.5 mm, reflect cognitive processing and behavioral activities.

Accommodation reflex is an unconditioned reflex of the eye, caused by the need to refocus on a near or distant object. The human ocular system achieves refocus with a triad of changes: 1) a change of shape of the crystalline lens, 2) a corresponding proportional change in pupil diameter, and 3) a vergence, which is a simultaneous movement of both eyes in opposite directions to obtain single binocular vision. The eyes converge as they focus on a nearby object and diverge when they focus on a distant object. When the subject focuses on a distant object, it also results in the flattening of the crystalline lens and an increased pupil size; whereas when focusing on a nearby object, the crystalline lens becomes more spherical and is accompanied by a decreased pupil size. The change of lens shape is required to change the refractive power of the lens.

Pupillary Light Reflex (PLR) is an unconditioned reflex, where the human ocular system strives to control pupil diameter, in response to changes in the intensity of light, which enters the eye and hits photosensitive ganglion cells on the retina of the eye. The reflex causes a change in the diameter of the pupil either a dilation/mydriasis (increase in diameter) or a constriction/miosis (a decrease in diameter); this leads to having an appropriate amount of light entering the eye for adequate visual perception to occur.

Under changing light conditions, pupil size will be changing and if accommodation reflex takes place, pupil size will change accordingly. Hence, to derive a component of pupillary response that is attributable to the changes in mental state only, the system needs to discount the component of pupillary response attributable to PLR or accommodation reflex, if such reflex took place during the tracking period. The basic formula is:

Total pupil dilation=PLR+Accommodation Reflex+
Pupil Dilation due to mental state changes Hence, Pupil Dilation due to mental state changes=Total
pupil dilation−(PLR+Accommodation Reflex)

We also refer to Pupil Dilation due to mental state change as Pupil Dilation mental state correlation coefficient. For the purposes of current patent disclosure, Pupil Dilation due to mental state changes may also refer to Task-Evoked Pupillary Responses (TERP).

It is possible to have no changes in light conditions, but have accommodation reflex affect pupil diameter. Alternatively, it is possible to have PLR take effect without the accommodation effect playing a role. Alternatively, it is possible to have both PLR and accommodation reflex affect pupil diameter in the same or opposite directions. Alternatively, it is possible that neither PLR nor accommodation reflex plays any role in changes to pupil size, such as when there are no changes in light conditions and no changes in focus during pupil dilation tracking. Then the Total pupil dilation=Task−Evoked Pupillary
Responses(TERP)

One difficulty in measuring pupil size is caused by a constant fluctuation in pupil diameter that occurs during waking hours. These spontaneous fluctuations occur simultaneously in both eyes and are about 1 mm in amplitude. These fluctuations are deemed to be caused and controlled by the autonomous brain mechanisms, which regulate pupil size according to the intensity of light stimulation. These fluctuations must be accounted for when deducing the TERP component of pupil dilation. Thus, to compute TERP, the system may utilize a variety of averaging models, for example, Gaussian distribution function, where the pupil diameter changes are averaged over certain periods of time to approximate a smoothing distribution, or "bell" curve, of dilation values. The TERP is measured in fractions of millimeter, as juxtaposed to background pupillary oscillations of about a millimeter; utilizing averages achieves "noise" free (or "noise" reduced) valuations.

In one exemplary, non-limiting embodiment, in order for the system proposed to properly handle all scenarios, it should detect PLR and accommodation reflex conditions and account for each or both, unless the measurements are made under constant light conditions and the object observed is at the constant distance from the observer during the evaluation period.

In one exemplary, non-limiting embodiment, the system may only monitor pupillary response assuming light exposure and focus depth remain constant during pupil diameter tracking. In this case, PLR or accommodation reflex may be disregarded.

In one exemplary, non-limiting embodiment, the system may monitor pupil size continuously over short or prolonged periods of time. In such a case, the system may need to carefully monitor PLR and accommodation reflex effects on pupillary size changes.

In one exemplary, non-limiting embodiment, the system may monitor pupil size only intermittently and on a short term basis whenever the context for pupillary evaluation changes or presents itself. Alternatively, the system may continuously track both pupillary response and related context responsible for pupillary diameter changes.

In one exemplary, non-limiting embodiment, the system may monitor pupil diameter changes while the eyelid is open.

In one exemplary, non-limiting embodiment, the system may monitor pupil diameter changes while the eyelid is closed and the subject is possibly asleep. In this embodiment, pupil dilation information, derived during sleep, may be used to analyze sleep patterns and may be used for diagnostic purposes.

In one exemplary, non-limiting embodiment, at step 106, the system may utilize a light exposure condition module to determine and track changes in the amount of light that hits the retina of the eye. At 106, the system may utilize a variety of light sensors to detect the level of ambient light at any given time.

In one exemplary, non-limiting embodiment, the system may comprise a step 108, to determine the focus change in order to compute the extent of pupil diameter change due to accommodation reflex. At step 108, there are a number of methods and tools that may be used to determine and track the changes in the focus (accommodation reflex).

In one exemplary, non-limiting embodiment, an accommodation reflex component may comprise an image capture device. The focus may be tracked by an image capture device aligned in parallel to the lens of the eye.

In one exemplary, non-limiting embodiment, an accommodation reflex component may comprise an integrated range finder or a depth sensor, aligned in parallel to the eye, which may be used to detect distance to the object being looked at. A depth sensor component may be implemented as a monochrome CMOS sensor, a CCD or a variety of MEMS type sensors. For example, it may be implemented as a graphene sensor. Such sensor may optionally be coupled with an IR emitter. An IR emitter may be integrated into the contact lens substrate or may optionally be installed on the glasses of the user of the contact lens, or alternatively, it may be mounted on some other device in the vicinity of the user.

In one exemplary, non-limiting embodiment, an accommodation reflex component may comprise an integrated sensor of signals from ciliary muscles. The system may track refocus by detecting and tracking changes in the form of a crystalline lens of the eye or tracking control signals of ciliary muscle of an eye. Where ciliary muscles of the eye are primarily responsible for the changes in the shape of the crystalline lens in the eye. The detected signals from ciliary muscle of an eye may correlate to the shape of the crystalline lens and be indicative of the focus depth of the eye at any given time. From the strength and length of the signals of ciliary muscle of an eye the extent of accommodation reflex is computed, there is pupil dilation or constriction accompanying every change of the shape of the crystalline lens.

In one exemplary, non-limiting embodiment, a more direct way to detect the accommodation reflex would be to observe the shape of the crystalline lens in the eye; hence, the accommodation reflex component may comprise a specialized eye facing sensor configured to detect the shape of the lens, it may optionally be coupled with an IR emitter.

In one exemplary, non-limiting embodiment, an accommodation reflex component may comprise an embedded infrared eccentric photo-optometer, which may be used to measure the extent of the accommodation reflex.

Furthermore, at step 107, the system evaluates a delta in pupil diameter, derived at step 102, in terms of the psychological (mental) or psychophysiological context derived at step 104.

In one exemplary, non-limiting embodiment, for example, in reactive, responsive and adaptive type of systems, the system may be implemented as an application executable on a smart device, such as a smart phone or a smart contact lens. An application may have a narrow and very specific functionality that will define the context in steps 104 and 105.

For example, a game console application showing augmented or virtual reality, may benefit from observing the player's pupil dilation in response to gaming behavior. The application (game) may be arranged to dynamically adjust and modify gaming strategy and behavior, as well as, modify game environment to be more accommodating, easier and pleasing for the user or, vice versa, more complex and difficult.

In one exemplary, non-limiting embodiment the system implementing an augmented reality application providing, for example, navigation and current environment information, may dynamically adjust the type of information fetched to the user based on computed pupillary response.

In one exemplary, non-limiting embodiment the system implementing an augmented reality application providing, for example, tutoring in mathematics, would adjust the difficulty level of problems given to the user, or the amount of explanation given to the user based on the pupillary response of the user.

In one exemplary, non-limiting embodiment the system may be used to track decision-making, and identify which and what decision the user made. In this case, pupillary response, depending on the context, may be used as a control mechanism, to trigger a reaction from the application. It is known that pupillary response, indicative of the decision made, precedes an action. Hence, pupillary response may be used as a decision or will indicator; it may be used as a binary control mechanism in certain applications, indicating yes or no, action or no action.

The process ends at step 109, where evaluation and detection cycle stops.

Figure 2:
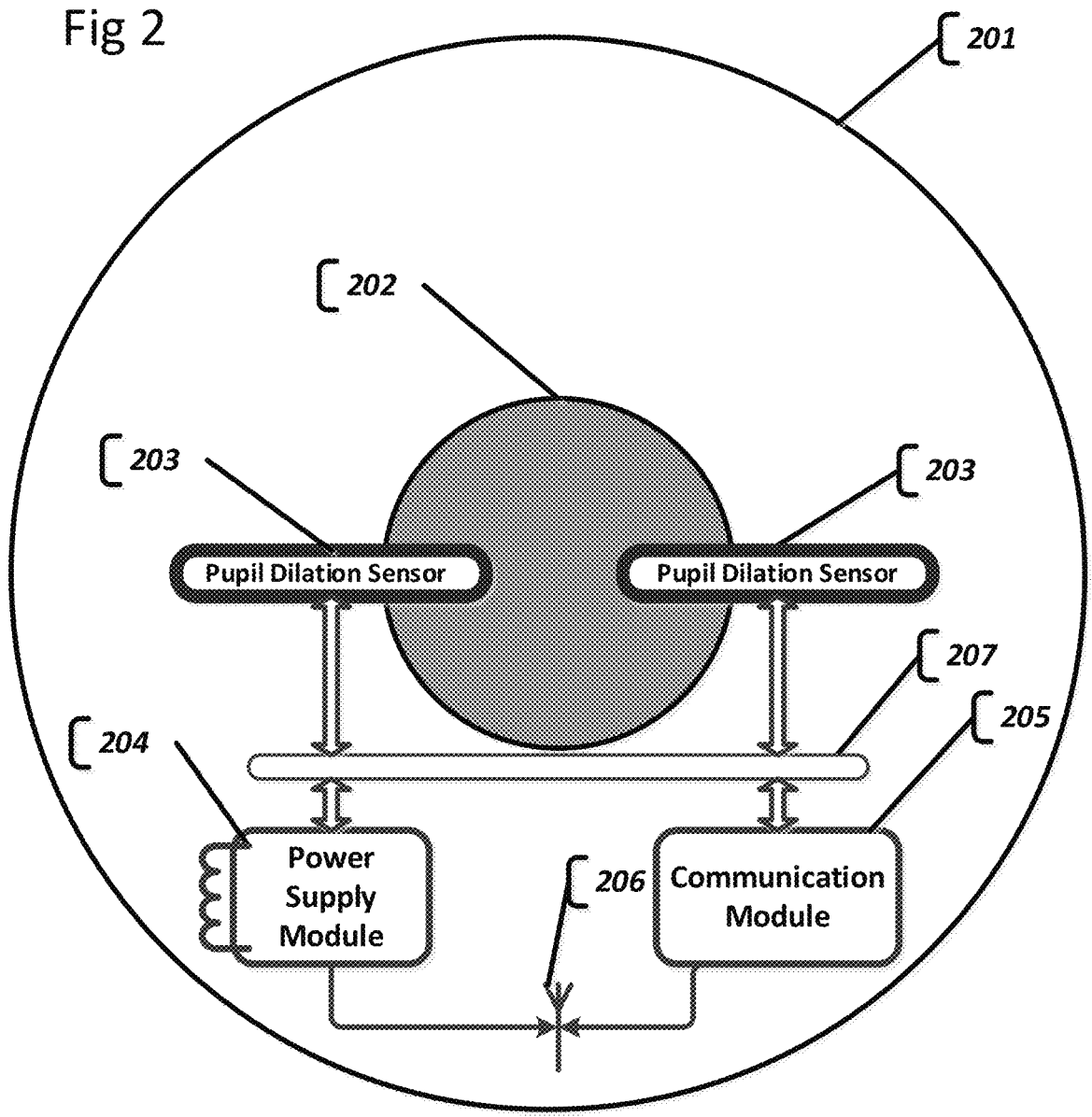
FIG. 2 is a schematic drawing of an active contact lens with pupil dilation sensor in light of the present invention.

In one exemplary, non-limiting embodiment, as per FIG. 2, a contact lens 201 is depicted. Component 202 refers to the portion of the contact lens overlaying the iris of the eye (an opening that results from pupil dilation). 202 may be made of the same material as and be homogeneous with the rest of contact lens substrate; alternatively, it may contain a variety of optical or electro-optical components.

In one exemplary, non-limiting embodiment, a pupil dilation sensor 203 is positioned inside the contact lens facing the eye. The pupil dilation sensor is embedded on the contact lens substrate so as to be situated on the cross border area of the pupil and iris of the eye.

According to one exemplary, non-limiting embodiment there is at least one pupil dilation sensor integrated into the lens substrate. According to one exemplary, non-limiting embodiment there is at least one pupil dilation sensor arranged on either inner or outer side of the lens substrate.

For a more accurate identification of the change/delta of the iris diameter/pupil dilation, multiple dilation sensors may be employed on the substrate on different sides of the iris/pupil.

The pupil dilation sensor is supplied with an electric current from an onboard power supply module 204. The power supply module may power the entire contact lens and all of its subsystems. In one non-limiting embodiment, the power supply may comprise an integrated onboard battery, an accumulator, or a capacitor. In one non-limiting embodiment, the power supply module 204 may derive electric power from an energy transfer antenna 206. The antenna 206 may generate its power from an RF power source located nearby. For example, the subject may carry an RF energy radiator on his/her glasses. In one non-limiting embodiment, the same RF radiator may serve as a correspondent communication transceiver for the communication module 205. The power supply module 204 may also receive electricity from a miniaturized solar panel, integrated into the contact lens substrate. The contact lens has an embedded, integrated electric circuitry 207 that connects various components of the system and also electro-wires the components, providing power to the active contact lens. The said electric circuitry also delivers electric power to the components of the system.

In one non-limiting, exemplary embodiment, a pupil dilation sensor 203 may be implemented as a CCD (charge-coupled device) array. The CCD is essentially an image sensor reacting to the intensity of available light, where each pixel is represented by a p-doped MOS capacitor. Here, the light hitting photoactive capacitor array triggers photon to electron transformation on the photoactive semiconductor, thereby generating an electric charge. The intensity of the charge generated is representative of the intensity of light collected. The charge from the capacitor is then dumped into the charge amplifier, which converts the charge into voltage.

In one non-limiting, exemplary embodiment, the CCD sensor may comprise a one-dimensional array to capture a singular, one-liner image. In one embodiment, the CCD sensor may comprise a two-dimensional array to capture a full image, as is used in photo or video cameras.

The CCD requires the presence of light in order to operate properly; hence, in the absence of light, the CCD requires an additional light to properly capture iris diameter. In one embodiment, the CCD sensor may be coupled with a light emitter to provide additional light. At the same time, the additional light may cause iris diameter to change because the eye needs to change aperture to adjust for the additional light. Consequently, the delta in iris diameter attributable to the addition of light should be subtracted from total delta in diameter, to identify the level of change attributable to the psychological or psychophysiological activity being estimated/evaluated. Ideally, the CCD in a dark environment may be coupled with an IR emitter. Infrared light is an invisible light that will not react with the retina's photosensitive cells and, hence, will not necessitate an aperture adjustment and will not result in pupil dilation or constriction. The CCD sensor may be reactive to both visible and near IR or IR light.

CCD may use available light in the environment without additional lighting.

In one non-limiting, exemplary embodiment, a pupil dilation sensor 203 may be coupled with an infrared emitter to avoid the problem described above, where visible light may affect the dilation process. Here, the sensor may be configured and calibrated to react to infrared illumination.

In one non-limiting, exemplary embodiment, a pupil dilation sensor 203 may be implemented as an EM-CCD sensor.

In one non-limiting, exemplary embodiment, a pupil dilation sensor 203 may be implemented as a CIS (Contact Image Sensor). Generally, CISs are inferior to CCDs in terms of the output image quality produced. CIS may use available light in the environment without additional lighting. CIS may also be adjusted to react to near IR or IR light. It may optionally be coupled with an IR emitter.

The underlying technology behind CIS is similar to the CCD. The silicon semiconductor is fragmented into square cells. CIS is embodied as a one-dimensional photoactive array. With CIS, there is a one-to-one correspondence between the amount of information being captured and the size of information produced. The quality of the produced image is adequate because of the proximity of the objects scanned/monitored. CIS was specifically designed, as the name suggests, for close proximity scanning. The amount of light required by the CIS sensor is minimal. As with the CCD sensor, under adequate light conditions, no additional light may be required. An infrared emitter may be used for light illumination.

In one non-limiting, exemplary embodiment, a pupil dilation sensor 203 may be implemented as a miniaturized PMT (photomultiplier tubes).

In one non-limiting, exemplary embodiment, a pupil dilation sensor 203 may be implemented as a miniaturized HPD (Hybrid photo-detectors).

In one non-limiting, exemplary embodiment, a pupil dilation sensor 203 may be implemented as a miniaturized general CMOS or a miniaturized monochrome CMOS sensor coupled with an IR emitter.

In one non-limiting, exemplary embodiment, a pupil dilation sensor 203 may be implemented as a PIR (Passive Infrared Sensor). This type of sensor detects changes in infrared radiation without not requiring the presence of visible light.

In one non-limiting, exemplary embodiment, a pupil dilation sensor 203 may be implemented as a miniaturized capacitance-detection type of infrared sensor utilizing the principle of a Golay-cell.

In one non-limiting, exemplary embodiment, a pupil dilation sensor 203 may be implemented as a graphene-based light sensor. Graphene requires much less energy than traditional CMOS or CCD sensors and has much higher light sensitivity.

It should be understood that any other method and type of sensor may be used to identify and detect changes in pupil diameter. The provided listing of some of the possible technologies that can be used to detect pupil dilation is only exemplary and should not be taken to be limiting to the scope of the invention. A multitude of other types of sensors may be employed to function as a pupil dilation/constriction sensor 203.

Figure 3:
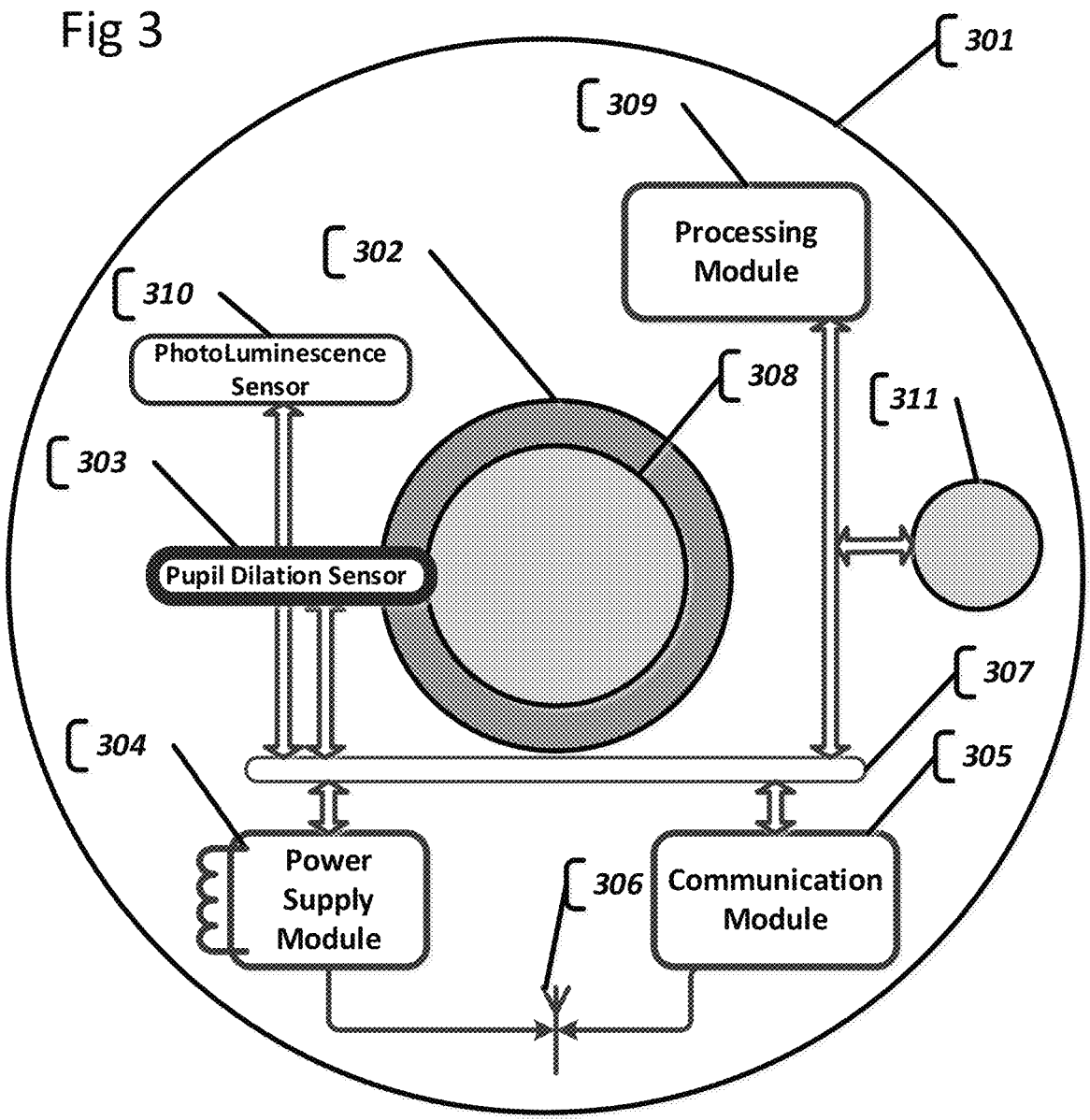
FIG. 3 is a schematic drawing of an active contact lens with pupil dilation sensor in light of the present invention.

In one non-limiting embodiment, as per FIG. 3, an active contact lens 301 is depicted.

Component 302 refers to the iris of the eye (an opening that results from pupil dilation). In one embodiment, a pupil dilation sensor 303 is integrated into the contact lens substrate facing the eye. In one embodiment, a pupil dilation sensor 303 is disposed on the inner side of the contact lens substrate. In one embodiment, a pupil dilation sensor 303 is disposed on the outer side of the contact lens substrate. A pupil dilation sensor is situated on the cross border area of the pupil and iris of the eye. Optionally, it may be situated over the pupil only and may have an angled or convex sensory surface, in order to sense at an angle without the need to be disposed directly over the cornea of the eye. According to one exemplary, non-limiting embodiment there is at least one pupil dilation sensor integrated into the lens substrate. For a more accurate identification of the change of pupil diameter, multiple dilation sensors may be employed on the substrate on different sides of the contact lens. An average dilation value derived from multiple dilation sensors may be used to evaluate the level of dilation.

A pupil dilation sensor is supplied with an electric current from a power supply module 304. The power supply module may power the entire contact lens and all of its subsystems. In one non-limiting embodiment, the power supply may comprise an integrated onboard battery, an accumulator, or a capacitor. In one non-limiting embodiment, the power supply module 304 may derive electric power from an energy transfer antenna 306. The antenna 306 may generate its power from an RF power source located nearby. For example, the subject may carry an RF energy radiator on his/her glasses. In one non-limiting embodiment, the same RF radiator may serve as a correspondent wireless communication transceiver for the communication module 305. The contact lens has an embedded, integrated electric circuitry 307, which connects various components of the system and also electro-wires the components, providing power to an active contact lens. The said electronic circuitry may also deliver electric power to the components of the system.

In one non-limiting, exemplary embodiment, a pupil dilation sensor 303 may be implemented as a CCD (charge-coupled device) array.

The CCD is essentially an image sensor reacting to the intensity of available light, where each pixel is represented by a p-doped MOS capacitor. Here, the light hitting the photoactive capacitor array triggers photon to electron transformation on the photoactive semiconductor, thereby generating an electric charge. The intensity of the charge generated is representative of the intensity of light collected. The charge from the capacitor is then dumped into a charge amplifier, which converts the charge into voltage.

In one non-limiting, exemplary embodiment, a pupil dilation sensor 303 may be implemented as a EM-CCD sensor.

In one non-limiting, exemplary embodiment, a pupil dilation sensor 303 may be implemented as a CIS (Contact Image Sensor). Generally, CISs are inferior to CCDs in terms of the output image quality produced.

In one non-limiting, exemplary embodiment, a pupil dilation sensor 303 may be implemented as a CMOS sensor, as a PMT (photomultiplier tubes), as a HPD (Hybrid photo-detectors), as a PIR (Passive Infrared Sensor), or as a miniaturized capacitance-detection type of infrared sensor, utilizing the principle of Golay-cell.

In one non-limiting, exemplary embodiment, a pupil dilation sensor 303 may be implemented as a graphene-based light sensor. Graphene requires much less energy than traditional CMOS or CCD sensors and has much higher light sensitivity.

In one non-limiting, exemplary embodiment, any light-based dilation sensor mentioned above may be coupled with an IR (infrared) emitter and the dilation sensor may be configured to be reactive to the infrared spectrum of light.

It should be understood that any other type of sensors may be used to detect and determine the level of dilation or constriction. The types of sensors described above are mentioned only by way of example and thus do not limit the scope of the present invention.

In one non-limiting, exemplary embodiment, a contact lens may be arranged with a transparent or semi-transparent or non-transparent display 308, positioned over the cornea of the eye. The display may be implemented as an LED display with a Fresnel lens integrated into the substrate of the contact lens, between the display and the cornea. The transparent or semi-transparent display 308 may be implemented as an active display, projecting each pixel directly onto the retina of the eye.

In one non-limiting, exemplary embodiment, a contact lens may be arranged with the light sensor 310. The sensor 310 may determine the level of luminescence as a function of amount of light in the environment, or it may detect location and direction of glare in the environment.

In one non-limiting, exemplary embodiment, a light sensor 310 may be implemented as a basic CMOS or CCD sensor, configured to measure the amount of ambient light in the environment. Many other sensor types may be used to implement the light sensor.

In one non-limiting, exemplary embodiment, the light sensor 310 may be implemented from any photosensitive material and may be implemented as a single-pixel sensor. For example, a pixel is represented by a p-doped MOS capacitor. Here, light hitting the photoactive capacitor array triggers photon to electron transformation on the photoactive semiconductor, thereby generating an electric charge. The intensity of charge generated is representative of the intensity of light collected. The charge from the capacitor is the dumped into the charge amplifier, which converts the charge into voltage. The voltage is representative of the strength of ambient light.

In one non-limiting, exemplary embodiment, a light sensor 310 may be implemented as a graphene-based light sensor. Graphene requires much less energy than traditional CMOS or CCD sensors and has much higher light sensitivity.

It should be understood, the description of light sensor listed here is not limiting to the scope of the invention and is provided by way of example.

In one non-limiting, exemplary embodiment, a contact lens may be arranged with a glare sensor 310.

In one non-limiting, exemplary embodiment, a contact lens may be arranged with a processing module 309, which may have several functions: a) control operations of the contact lens; b) process information from a variety of sources, for example, external or internal data storage; c) process and analyze observed changes in pupil diameter (process pupillary response); d) overlay contextually relevant information onto the display component 308; e) process the amount of light information fetched from the light sensor 310.

A processing module 309, inter alia, may be evaluating the context of the pupil dilation by, for example, monitoring what the user is looking at or by monitoring the orientation of the user's gaze.

In one non-limiting, exemplary embodiment, a processing module 309 may compute the TERP value and track the dynamics of changes in the TERP based on the task context. To compute the TERP value, it may take the pupillary dilation value 'as-is' assuming there are no changes in the amount of ambient light and no changes in depth focus.

In one non-limiting, exemplary embodiment, a processing module 309 may compute the TERP value and track the dynamics of changes in the TERP with regard to the task context. To compute the TERP value, it may take the pupillary dilation value and discount for the pupillary reflex due to ambient light changes in the environment. To achieve that, the system determines the change to ambient light conditions and correlates it to the pupillary dilation observed by the pupillary dilation sensor.

In one non-limiting, exemplary embodiment, a processing module 309 may compute the TERP value and track the dynamics of changes in the TERP, based on the task context. To compute the TERP value, it may take the pupillary dilation value and discount for the accommodation reflex based on pupillary response.

In one non-limiting, exemplary embodiment, a processing module 309 may be implemented as a miniaturized CPU, GPU, HPU, or any other processing component capable of performing computations and executing computer instructions. The processing module may be implemented with MEMS that are micro or nano scaled.

In one non-limiting, exemplary embodiment, a processing module 309 may be integrated into the contact lens substrate.

In one non-limiting, exemplary embodiment, a processing module 309 may be arranged outside of the contact lens and linked with the system by a wireless communication channel. The processing module may, for example, be located on the glasses worn by the user; alternatively, it may be located on a mobile phone. The processing module used may be a computer system connected with the contact lens system. The processing module may be a part of any other system. Other arrangements are also possible.

A processing module 309, inter alia, may be arranged to execute and run programs. A program may be an application that may dictate the context for evaluation. For example, an application may be a virtual reality game or a math tutor or an instant messaging application. In every case, the context is formed by the application itself. For example, in the case of a game application, the context is the current game environment and the disposition of constituent parts, if the virtual reality is created by the game; In the case of the augmented reality application, the where information is superimposed onto the embedded display, the context may be both the information superimposed, as well as, the observable reality and, specifically, the objects/subjects the user of the lens is focusing on. It may be the attractiveness of objects or interest in the objects depicted. In dating applications the context may be attractiveness of a candidate. In the case of math tutor application the context may be the complexity of the problem or a memorization aspect, and the application may be developed to react to TERP, by changing the data quality fetched to user depending on the context, for example, the amount of information given to the user, or changing amount of explanation given to the user, or by changing level of complexity of problems presented to the user.

In one non-limiting, exemplary embodiment, a processing module 309 may be arranged to compute the level of correlation between the pupillary response, fetched by the pupil dilation sensor 303, and the application stimuli, or the pupil dilation mental state context. The processing module 309 may compute the extent of the correlation by discarding "noise" dilation or constriction that is caused by changes in light conditions or other irrelevant factors.

In one non-limiting, exemplary embodiment, the system may include an image capture component 311. An image capture device might be implemented as a CMOS, a monochrome CMOS, a CCD image sensor, or any MEMS type of component; it may be implemented as an ultrathin graphene sensor, or with any other known means of capturing an image.

In one non-limiting, exemplary embodiment, the image capture component is arranged to be on the same parallel to the eye orientation in order to capture the image that corresponds to the user's gaze.

In one non-limiting, exemplary embodiment, the system measures the change in the distance to the objects, being observed, that is objects that are in focus at any given time. The system uses this information as an adjustment to the accommodation reflex, where the change in focus may cause a dilation or a constriction of the pupil as function of refocus, in calculation of actual pupillary response attributable to the context being solved for.

In one non-limiting, exemplary embodiment, an image captured by an image capture component 311, may be analyzed by the system in relation to pupillary response observed.

While components 310 and 311 may yield a more precise measurement of the actual pupillary response attributable to the monitored psychological or psychophysical aspect; it should be understood that the system proposed hereby, may be arranged to contain either image capture component 311, or light, or a glare sensing component 310, or other components that enable the system to determine and track the accommodation reflex or PLR. The current description of the invention is purely exemplary and should not be taken as limiting to the scope of the invention.

In one non-limiting, exemplary embodiment, the system may be configured to provide an interface for the computer application to use dilation TERP to adapt to the subject's response. The interface may be a software API or a hardware solution. The interface may be provided to retrieve separately the PLR attributable pupil dilation values and the accommodation reflex—attributable pupil dilation values, as well as, the TERP value computed.

In one non-limiting, exemplary embodiment, the applications implemented for the system proposed, may be configured to use the dilation TERP as the subject's decision marker.

In one non-limiting, exemplary embodiment, the applications implemented for the system proposed, may treat TERP as the subject's attitude valence or disposition marker.

It should be understood that the pupillary response may be used for a variety of other purposes depending on the context of the application.

In one non-limiting, exemplary embodiment, a processing module 309 may be an integrated component into the contact lens substrate or alternatively, may be disposed on a wirelessly connect, to the contact lens, smart device.

The latest research on pupil dilation shows that the pupillary response is somewhat individualized and tends to differ between people. There is research that shows that pupillary response has a greater similarity for identical twins then for fraternal twins, and even less similarity is observed for non-related siblings (Block research 1976). There might be some difference in unrelated people in their pupillary response. Hence, it makes sense for adaptive and responsive systems and applications to calibrate to an individual pupil responsiveness; namely to calibrate the system's response factors, by tracking, learning and inferring from the individual subject's pupillary response over time; and hence, improving the system's understanding, predictability and responsiveness outcomes to the user's reactions within the framework of a specific context forming application and system.

In one non-limiting, exemplary embodiment, provided that the expression of pupillary response to PLR or Accommodation reflex is individualized, and varies between people and depends on a number of factors, the system may implement a calibration mechanism. The system may "learn" (derive) individualized responses for a particular user, in special calibration mode, where the system is configured to observe both pupillary response and the level of ambient light over time, and measure the changes to PLR in a variety of lighting conditions. Also, the system may be calibrated for the accommodation reflex, where the system learns about extent of the accommodation reflex taking place and resulting pupil dilation or constriction, based on refocusing taking place. For both PLR and accommodation reflex, the correlation values are established and saved for the future use by the system.

Figure 4:
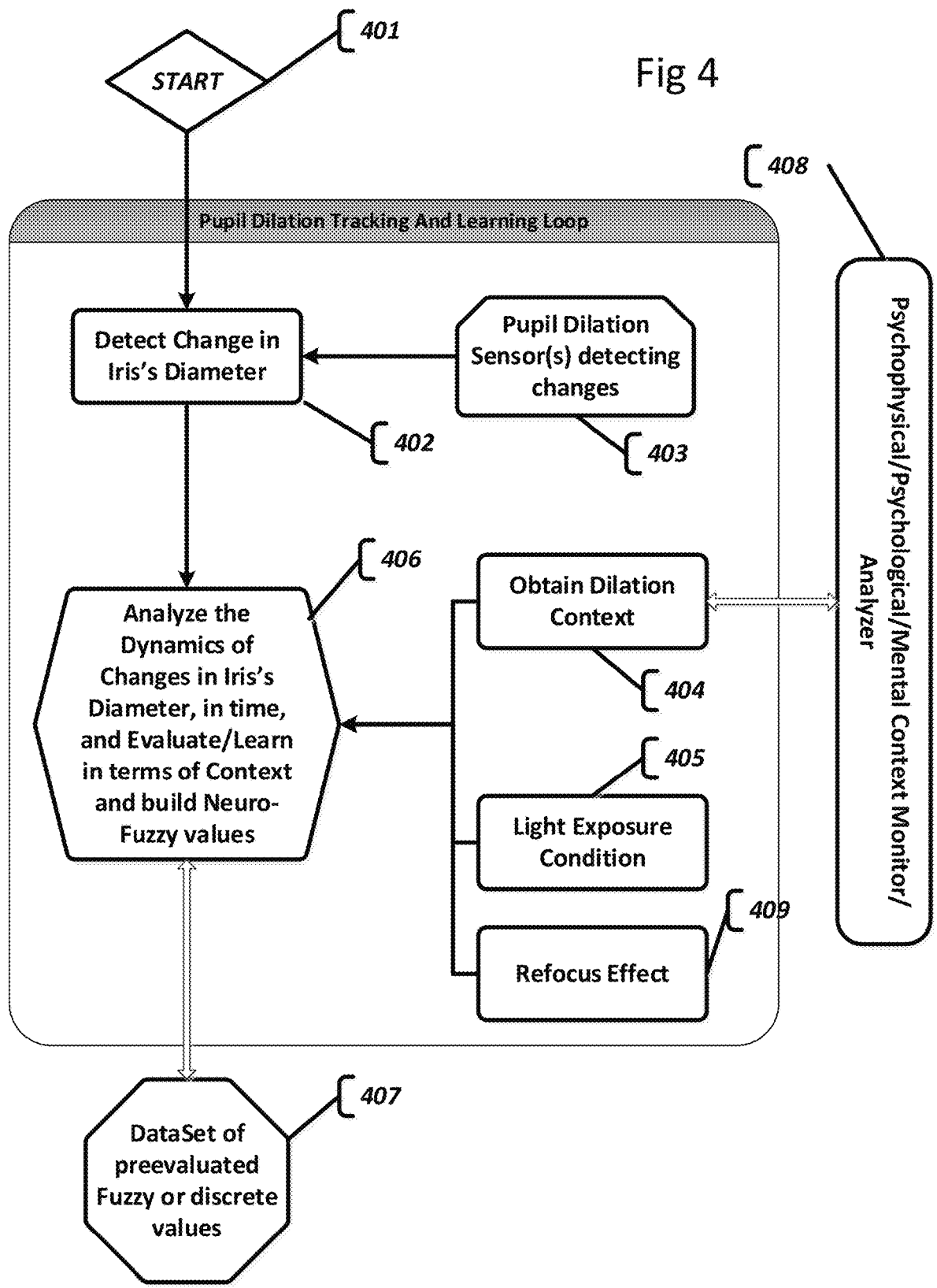
FIG. 4 is a process flow diagram, describing the flow of a system learning process from pupillary response in light of present invention.

In one exemplary, non-limiting embodiment, as per FIG. 4, a flow diagram illustrates one possible aspect of the present invention. The process starts at step 401, for example, by a voice command, or by pressing a button on a smart phone to start the operation of the system, or by a predefined series of eye blinks (denoting activation of the process), etc. The active contact lens system, starts tracking, evaluating and learning the dynamics of individual pupil dilation patterns in light of the particular context. The system detects alternation of iris's diameter at step 402, utilizing an embedded into an active contact lens, pupil dilation sensor 403.

In one exemplary, non-limiting embodiment, at step 404, the system determines the dilation context using context monitor or analyzer 408. In one exemplary, non-limiting embodiment, a computer program also known as an application, being executed by the system, may present and provide the context for evaluation, without the need for context tracking and analysis. In one exemplary application, the context may be expressed as a level of difficulty of the problem the user was to solve, or the size of the data set the user may need to mentally digest. Another aspect of the context may optionally be the subject's familiarity index with the data being processed. Familiarity index is a measure of how well the user is acquainted with the subject. In one exemplary, non-limiting application, the context may be information about the gender and "level of attractiveness" of man or woman the subject is observing. In one exemplary, non-limiting embodiment, the context may be decision making, where the environment will dictate, for example, a binary outcome for the decision for example "Yes or "No". In one exemplary, non-limiting embodiment, the context may be a multi-faceted information and may be derived from a variety of psychophysical and psychological monitors and sensors. For example, it may be a heart monitor, a brain activity monitor, blood pressure monitor or, for example, real-time blood evaluator that detects and evaluates hormonal changes, as well as, a variety of protein markers, and other markers that may help to evaluate and the context of pupil dilation/constriction.

A multitude of other context tracking aspects and techniques may be utilized for the determination of context in light of the present invention.

In one non-limiting embodiment, at step 406, contextual evaluation of the pupil dilation or constriction is executed. The system may take into account level of light exposure derived at step 405.

In one non-limiting embodiment, at step 406, contextual evaluation of the pupil dilation or constriction is executed. The system may take into the account the level of refocus taking place derived at step 409.

In one exemplary, non-limiting embodiment, at step 406, the system may evaluate dilation with respect to the context or a multifold of contexts observed and tracked. The system may utilize a variety of mathematical methods for evaluation, for example, statistical models and stochastic calculus.

In one exemplary, non-limiting embodiment, at step 406, the system may utilize a variety of AI (artificial intelligence) methods; for example, non-monotonic reasoning techniques and methods. The system may utilize neural networks, adaptive neuro-fuzzy modeling methods to evaluate and learn about dynamics of changes in pupillary response in connection with one or more contexts. The fuzzy models from adaptive networks class of models and, for example, derived from it, adaptive network based fuzzy inference system (ANFIS) poses a number of advantages over plain neural network learning, and thus may be preferred for the implementation of learning and inference of correlation between pupillary response and stimuli.

In one non-limiting embodiment, at step 406 a variety of NLP (natural language processing) and machine learning techniques may be used to evaluate pupillary response relative to a given stimuli. Where stimuli represents verbal/speech data.

It would be evident to persons skilled in the art, that a variety of other methods may be used to evaluate, learn, and infer correlation patterns of pupillary response in connection with one or more contexts. Above description should not be taken to be limiting to the scope of the invention, and should be deemed to include any other method of evaluation, learning or inferring correlation between pupillary response and a variety of contexts.

Furthermore, in one exemplary, non-limiting embodiment, at step 407, the system may include data storage or a database of systemically inferred and learned data, derived at step 406. The data stored, inter alia, may represent correlation data measuring extent and speed of pupillary response to germane contextual stimuli.

In one exemplary, non-limiting embodiment, at step 407, the system may include data storage or a database to store unevaluated (raw) pupillary response data, or the actual pupil diameter. The raw pupillary response data may be enhanced with associated time stamp, or contextual information, or luminescence information at the time of dilation. The data may be stored for future processing.

In one exemplary, non-limiting embodiment, moreover, the information derived at step 406, and stored in data storage at 407, may be fed back for processing and may be further be used for continuous evaluation and inference at step 406, enabling the system to improve inference and prediction outcomes. Hence, it would make the system more usable.

In one exemplary, non-limiting embodiment, moreover, the data storage may be implemented as an onboard memory storage, integrated into the contact lens, alternatively, it may be implemented as a remotely available data storage as part of the active contact lens system. Data storage may use a variety of memory chips, using a variety of known technologies.

Figure 5:
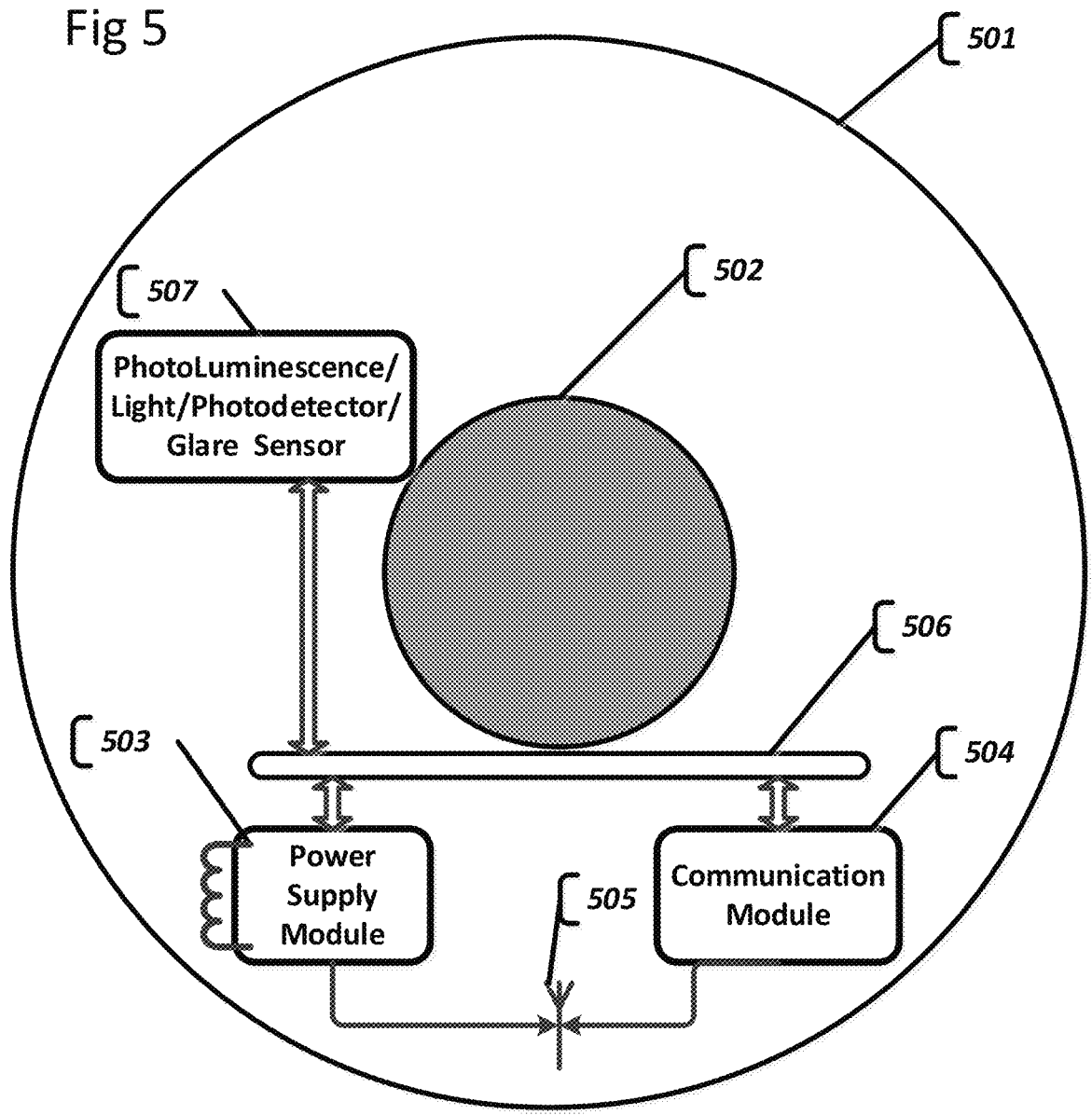
FIG. 5 is a schematic drawing of an active contact lens with pupil dilation sensor in light of the present invention.

In one exemplary, non-limiting embodiment, as per FIG. 5, a contact lens 501 is depicted. A component of an active contact lens connoted as 502, refers to the portion of the contact lens overlaying the iris of the eye (an opening that results from pupil dilation). 502 may be implemented of the same material as and be homogeneous with the rest of the contact lens substrate; alternatively, it may contain a variety of optical or electro-optical components. The active contact lens system electricity needs are provided for by the power supply module 503. The power supply module may power the entire contact lens and all of its subsystems. In one exemplary, non-limiting embodiment, the power supply may comprise an integrated onboard battery, accumulator, or capacitor. In one non-limiting embodiment, power supply module 503 may derive electric power from the energy transfer antenna 505. The antenna 505 may generate its power from an RF power source, located in close proximity to the active contact lens. For example, the subject may carry an RF energy radiator on his/her glasses. In one exemplary, non-limiting embodiment, the same RF radiator may serve as a correspondent communication transceiver for the communication module 504. In one exemplary, non-limiting embodiment, the power supply module 503 may derive power from a solar panel embedded, into the contact lens substrate.

In one exemplary, non-limiting embodiment, energy transfer antenna 505 may be operationally coupled with communication module 504. The communication module may be used to transmit data from contact lens and to an external communication source and vice versa from external communication source to an active contact lens.

In one exemplary, non-limiting embodiment, the communication module may be used to transmit data/signals from one active contact lens to another active contact lens.

In one exemplary, non-limiting embodiment, the two contact lenses, may be connected with each other wirelessly via a communication channel in either master slave relationship; whereas a master instance contact lens will be configured to control a variety of operations of the subordinate contact lens.

In one exemplary, non-limiting embodiment, the two contact lenses, may be connected with each other wirelessly via a communication channel in a peer-to-peer relationship, where each peer has an equal functional responsibility, and both contact lenses coordinate shared functionality; such as, for example, displaying superimposed image onto the transparent embedded display for both eyes.

In one exemplary, non-limiting embodiment, the electric circuitry 506, connects all electronic components of an active contact lens and may also function to transfer data and signals between components of an active contact lens.

In one exemplary, non-limiting embodiment, component 507 may comprise Luminescence or Photoluminescence or light sensing or photo detector or glare sensing and may be used to identify and track any changes in level of luminescence or ambient light and glare of the user's environment. The purpose of component 507 is to detect changes in light or other electromagnetic energy. The component 507 may be comprised of one or more types of sensor(s) capable of detecting and determining the level of visible or invisible light and the electromagnetic energy in the environment of the user. The component 507 is an outer-facing component.

In one exemplary, non-limiting embodiment, the component 507 may be implemented with an Active-pixel sensor (APS). CMOS type of sensors is a good example.

In one exemplary, non-limiting embodiment, the component 507 may be implemented as a monochrome CMOS sensor.

In one exemplary, non-limiting embodiment, the component 507 may be implemented with charge-coupled devices (CCD).

In one exemplary, non-limiting embodiment, the component 507 may be implemented as a glare sensor with a CMOS-based "smart" focal plane array (CFPA) chip. In current embodiment, each pixel consists of a photo-detector and signal processing circuitry. Pixel-specific signal processing circuitry consisting of a comparator and readout, will yield output when the strength of the signal is greater than a predefined and preconfigured threshold. The CFPA sensor may be arranged to detect a specific location (direction/orientation) of glare in the environment.

In one non-limiting, exemplary embodiment, a light-sensing component 507 may be implemented as a graphene-based light sensor. Graphene requires much less energy than traditional CMOS or CCD sensors and has much higher light sensitivity.

In one exemplary, non-limiting embodiment, component 507 may be implemented with a variety of chemical detectors, such as photographic plates, where the silver halide molecule is split into an atom of metallic silver and a halogen atom.

It should be understood that component 507 might be implemented with a variety of other light and electromagnetic energy-detecting mechanisms and sensors. Descriptions provided here are exemplary and should not be taken to be limiting to the scope of the invention.

It is very useful to keep the level of light entering iris of the eye constant or nearly constant, regardless of the changes in ambient light in the environment of the user. First, in case of quick and significant increase in the level of lighting in the environment, the subject's adjustment to the change may be unpleasant and, in some cases, temporarily blinding. Second, when measuring TERP, canceling pupillary response due to pupillary reflex is especially beneficial.

Figure 6:
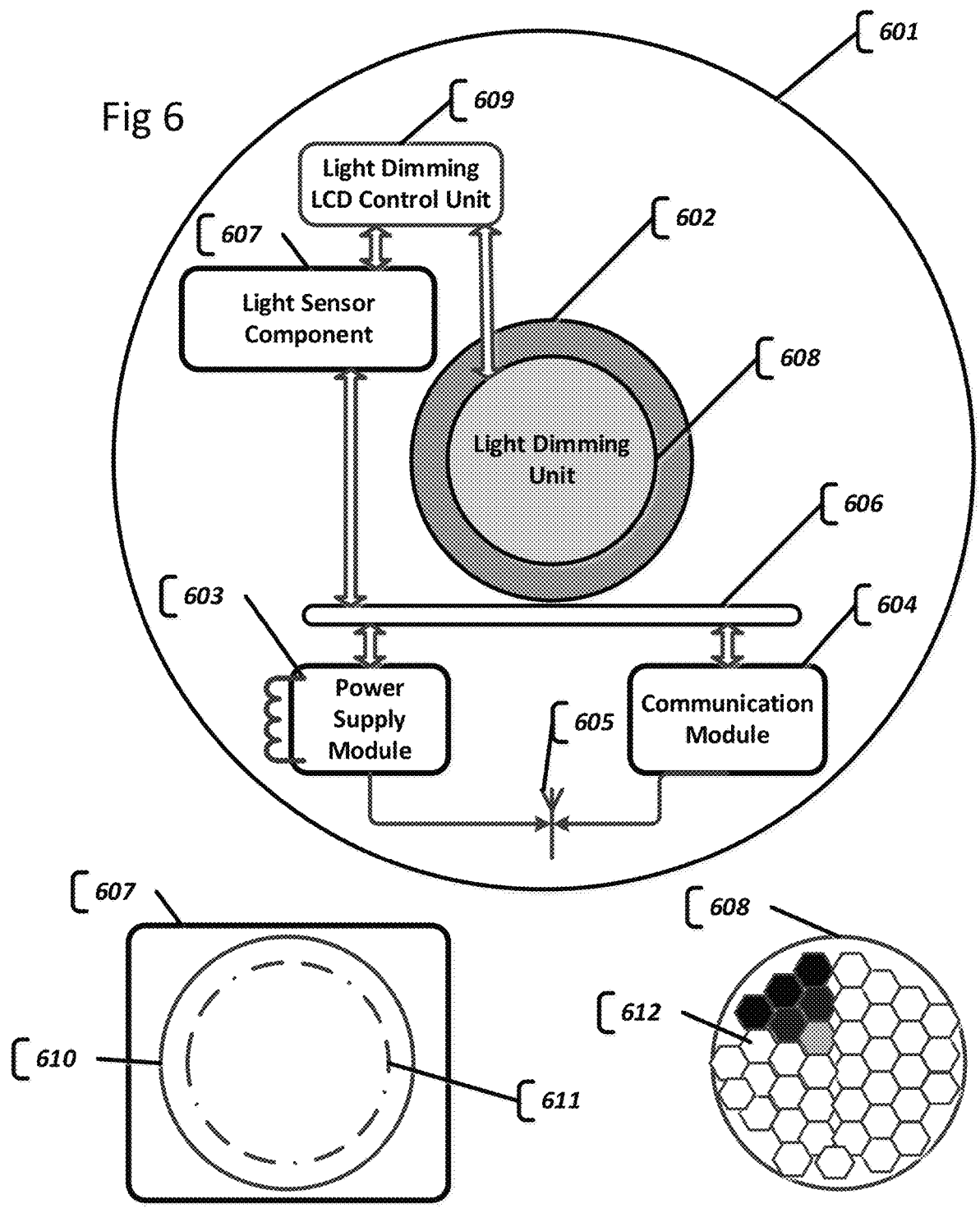
FIG. 6 is a schematic drawing of an active contact lens with a light sensor coupled with a light level stabilizer, which is integrated into contact lens, in light of the present invention.

In one exemplary, non-limiting embodiment, as per FIG. 6, a contact lens 601 is depicted. A component of an active contact lens, connoted 602, refers to the portion of the contact lens overlaying the iris of the eye (an opening that results from pupil dilation). 602 may be implemented of the same material as and be homogeneous with the rest of contact lens substrate. Alternatively, it may contain a variety of optical or electro-optical components. The active contact lens system' electricity needs are provided for by the power supply module 603. The power supply module may power the entire contact lens and all of its subsystems. In one exemplary, non-limiting embodiment, the power supply may comprise an integrated onboard battery/accumulator. In one non-limiting embodiment, the power supply module 603 may derive/produce electric power from the energy transfer antenna 605. The antenna 605 may generate its power from an RF power source, located in close proximity to the active contact lens. For example, the subject may carry an RF energy radiator on his/her glasses. In one exemplary, non-limiting embodiment, the same RF radiator may serve as a correspondent communication transceiver for the communication module 604. In one exemplary, non-limiting embodiment, the power supply module 603 may derive power from a solar panel embedded into the contact lens substrate.

In one exemplary, non-limiting embodiment, the energy transfer antenna 605 may be operationally coupled with the communication module 604. The communication module may be used to transmit data from the contact lens and to an external communication source, and vice versa, from an external communication source to the active contact lens.

In one exemplary, non-limiting embodiment, the communication module may be used to transmit data/signals from one active contact lens to another active contact lens.

In one exemplary, non-limiting embodiment, the two contact lenses may be connected to each other wirelessly via a communication channel in a master-slave relationship, where a master instance contact lens will be configured to control a variety of operations of the subordinate contact lens.

In one exemplary, non-limiting embodiment, the two contact lenses may be connected to each other wirelessly via a communication channel in a peer-to-peer relationship, where each peer has equal functional responsibility and both contact lenses coordinate shared functionality.

In one exemplary, non-limiting embodiment, an electric circuitry 606 connects all electronic components of an active contact lens and may also transfer data and signals between components of an active contact lens.

In one exemplary, non-limiting embodiment, light sensing or photo detector or glare sensing component 607 may be used to identify and track any changes in level of ambient light and glare of the user's environment. The purpose of the component 607 is to detect changes in light or in other electromagnetic energy. In one exemplary, non-limiting embodiment, a light sensor component 607 may be configured to identify the angle of the source of bright light (sunlight, for example). The component 607 is outer-facing component.

The amount of light entering the eye may change due to a change in the level of surrounding ambient light, for example, when the sun goes down, or when the subject enters a differently lit room whose ambient light is of a different color temperature. In such a case, in order to determine the change in amount of light, a general light sensor may sufficient.

The amount of light entering the eye may change even if the ambient light stays the same, when the position of the eye changes relative to the source(s) of light. For example, when the subject changes his sight angle relative to the sun and turns his face towards the sun. Direct sunlight may hit the retina under a certain angle. To account for such a variation of light changes, the system needs to determine the vector of the sources of light relative to the eyesight. Consequently, the system can proportionally block and dim an applicable portion of the eye to preserve the amount of background ambient light entering the eye and to keep the eye from having to adjust aperture with pupillary reflex.

In one exemplary, non-limiting embodiment, a component 607 may comprise a variety of light sensor(s) 611; optionally, it may comprise a focusing lens 610.

In one exemplary, non-limiting embodiment, a component 607 may comprise a number of similar or dissimilar types of light sensors. There might be multiple sensors installed on the outer perimeter of the contact lens; the sensors may be positioned under the direct angle relative to the position on the concaved contact lens, where the sensor is positioned. In such embodiment, different light sensors will yield potentially different values depending on how close the sensor is to direct sunlight. Combining values from each sensor would allow the system to determine the actual vector of the source of light.

In one exemplary, non-limiting embodiment, a sensor 611 may be implemented with an Active-pixel sensor (APS). CMOS type of sensors is a good example.

In one exemplary, non-limiting embodiment, a sensor 611 may be implemented as a monochrome CMOS sensor.

In one exemplary, non-limiting embodiment, a sensor 611 may be implemented with charge-coupled devices (CCD).

In one exemplary, non-limiting embodiment, a sensor 611 may be implemented as a glare sensor with CMOS-based "smart" focal plane array (CFPA) chip. In current embodiment, each pixel consists of a photo-detector and signal processing circuitry. Pixel-specific signal processing circuitry, consisting of a comparator and a readout, will yield output when the strength of the signal is greater than a predefined and preconfigured threshold. CFPA sensor may be arranged to detect specific location (direction/orientation) of glare in the environment.

In one non-limiting, exemplary embodiment, a pupil dilation sensor 611 may be implemented as a graphene-based light sensor. Graphene requires much less energy than traditional CMOS or CCD sensors and has much higher light sensitivity.

In one exemplary, non-limiting embodiment, a sensor 611 may be implemented with a variety of chemical detectors, such as photographic plates, where a silver halide molecule is split into an atom of metallic silver and a halogen atom.

In one exemplary, non-limiting embodiment, a luminescence component 607 may be implemented with a CCD sensor 611, which may be coupled with a focusing lens 610, arranged to focus an image onto the underlying CCD sensor 611.

In one exemplary, non-limiting embodiment, a luminescence/light component 607 may be coupled with a light dimming control unit 609, comprised of a comparator unit to identify the section of the CCD array which generated the highest voltage, (where the highest voltage values would correspond to the location of the brightest light incidence on the CCD), and a control circuit to dim relevant sections of the shutter matrix 608.

In one exemplary, non-limiting embodiment, a light dimming control unit 609 is implemented as a CPU, HPU, GPU or any other micro- or nano-scaled electronics chip capable of computing.

In one exemplary, non-limiting embodiment, a light dimming control unit 609 strives to keep the amount of ambient light entering the eye at a certain, system or user defined constant level.

In one exemplary, non-limiting embodiment, to achieve that, the system measures the amount of ambient light in the environment, or determines a vector (orientation) of the source(s) of the brightest light and the amount of light. Then, the system computes the level of dimming required to keep the amount of light, entering the eye, constant. When a vector or the orientation of the bright light is known, the system computes the appropriate level of dimming required for each section of the light-dimming unit.

In one exemplary, non-limiting embodiment, when the light is evenly or nearly equally distributed in all directions, then the light dimming control unit 609 determines the change in the amount of light, computes the proportionally appropriate level of dimming across all sections of light dimming unit and applies the dimming on all sections.

In one exemplary, non-limiting embodiment, a shutter matrix 608 is made of transparent material where each section of the shutter matrix is electrically controlled.

In one exemplary, non-limiting embodiment, a shutter matrix may be implemented as a liquid crystal display (LCD) component. Where LCD shutter matrix consists of plurality of LCD sections. Each LCD section can be dimmed independently by applying an electric charge to a particular section or to a number of sections of the LCD. The level of dimming is also controllable by applying different levels of the electric charge to different sections. Thus, sections that are most directly exposed to bright light, are dimmed more than the sections that are exposed only marginally.

The system is configured to identify the angle of incident bright light and determine the location (angle) of the brightest light (sunlight) to dim the associated section(s) of transparent LCD, so that bright light does not significantly affect vision and does not cause noticeable pupil dilation in the subject.

Generally, the human eye responds to the changes in light intensity within 50-100 ms depending on light intensity and a number of other factors. The active contact lens system proposed herein will enable the LCD to be dimmed much faster than the human neuro-physiological mechanism can react. Hence, the goal of such system is to eliminate pupil diameter changes attributable to pupillary reflex and allows the eye to stay focused without having to adjust the crystalline lens due to changes. This can be achieved by dynamically changing the opacity of different sections of the LCD lens component.

It should be understood that component 607 might be implemented with a variety of other light and electromagnetic energy-detecting mechanisms and sensors. Descriptions provided here are exemplary and should not be taken to be limiting to the scope of the invention.

Figure 7:
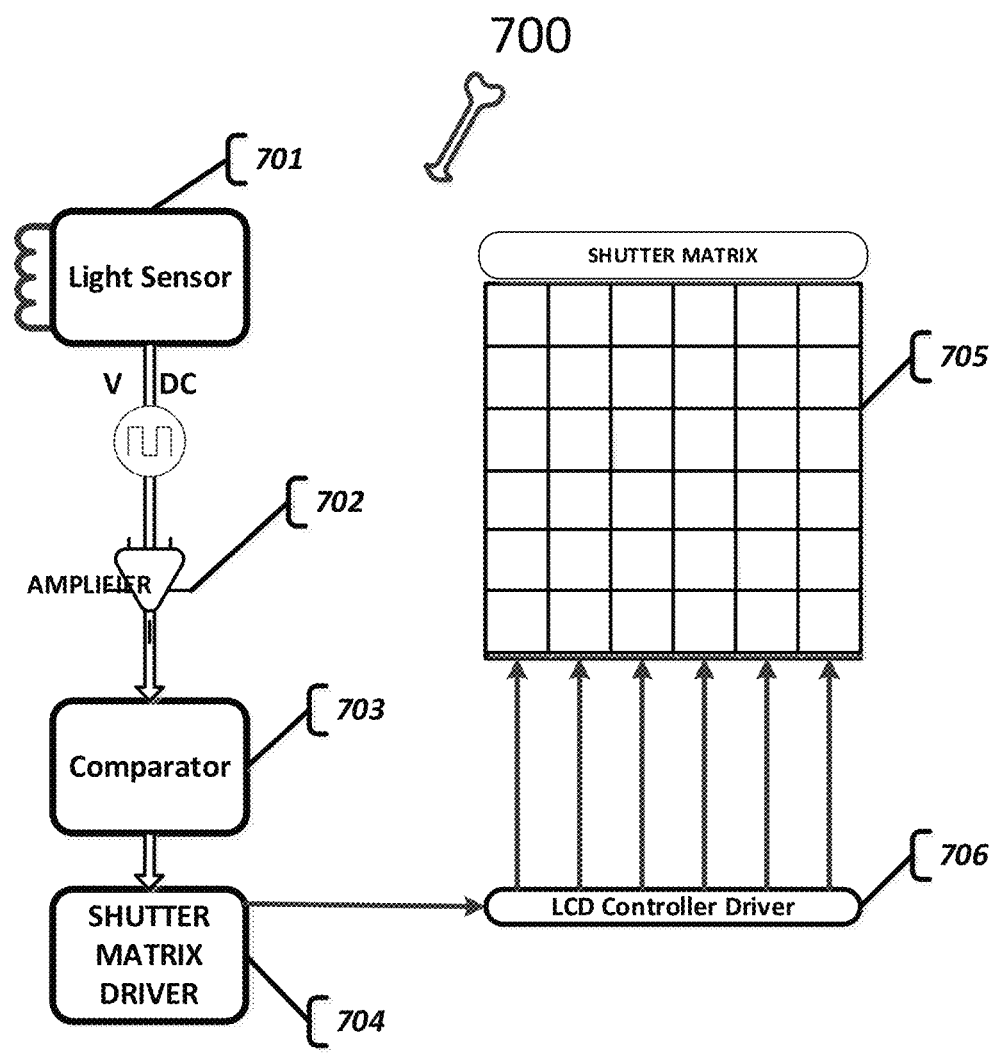
FIG. 7 is an electric schema of a controller unit of an active contact lens with a light sensor coupled with a light level stabilizer, which is integrated into contact lens, in light of the present invention.

Furthermore, FIG. 7 depicts an exemplary control electronic schema 700 of the system described by FIG. 6.

In one exemplary, non-limiting embodiment, a light sensor 701 may be a CCD or a CMOS sensor with multiple pixels; this component corresponds to component 611 in FIG. 6. Focused light rays hit the light sensor surface. Since the light is focused, most intensive rays of light from sunlight or other sources of light hit a specific section of the CCD sensor array. Focused light allows the system to determine the angle of incidence of the light source (sunlight, electric bulb, etc.) and the location of incidence on the sensor. The CCD sensor outputs a direct current voltage, which gets amplified in an amplifier unit 702. The amplifier 702 further outputs an amplified signal per each pixel in the CCD sensor to the comparator unit 703.

In one exemplary, non-limiting embodiment, a light sensor 701 may be implemented with a number of photosensitive sensors disposed on the outer perimeter of the contact lens substrate. The combination of outputs from each light sensor will determine the direction of the bright light. In this case, there is no need to have focused light; the light may be scattered and different sections of the contact lens will be exposed differently; hence, different sensors will yield different voltage values. The comparator unit 703 will compare the output from different sensors and determine the vector of the brightest light.

The comparator unit 703 is configured to identify from its input the section of highest voltage corresponding to the sunlight, and measure the voltage value that corresponds to the strength of the incident light.

In one exemplary, non-limiting embodiment, a Shutter Matrix Driver 704 coupled with a comparator unit 703, determines which sections of LCD Shutter Matrix 705 correspond to the highest voltage values, and what should be the level of dimming performed. Based on the provided voltage values, appropriate dimming of the relevant LCD sections is performed. The Shutter Matrix Driver 704 coupled with a comparator unit 703 maintains a map between light sensor pixels and the corresponding LCD sections. The map is used as a lookup to determine which sections of the transparent LCD should be dimmed and to what extent (level) to preclude direct sunlight from hitting the eye, where the sections selected for dimming, correspond to the set of pixels with highest voltage values.

The mapping of CCD pixels to LCD shutter matrix sections takes into account the optical attributes of the focusing lens, if any.

In one exemplary, non-limiting embodiment, the system may comprise a plurality of light sensors disposed on the contact lens either orthogonal angle 90 degrees relative to the iris of the eye. Alternatively, the sensors may be disposed on the contact lens substrate under the same or different angle non-orthogonally relative to the iris of the eye. In current exemplary embodiment, the comparator unit 703 would compare values from a plurality of sensors and detect regions of the highest voltage. By comparing voltage output from the plurality of light sensors, taking into consideration the angle of the light sensor disposition, as well as, the position on the contact lenses, the comparator unit 703 may determine the relative angle of the source or a number of sources of bright light. Consequently, the Shutter Matrix Driver 704 determines which section(s) of the Shutter LCD Matrix should be dimmed and to what level. The system may choose to dim different sections of the LCD matrix to different levels depending on the level of brightness of the light source the system aims to block.

Once determination is made, a control signal is passed to the LCD controller driver 706. The LCD control driver dims the affected sections of the LCD Shutter Matrix 705. The end result is that there is very little pupillary response due to changing light conditions.

In one exemplary, non-limiting embodiment, the system may comprise an accommodation detection module. The accommodation detection module is configured to determine the extent of the accommodation reflex taking place.

There are several ways the extent of accommodation reflex may be detected and tracked.

In one exemplary, non-limiting embodiment, the system may comprise a contact lens substrate 801. Component 802 designates the section of the contact lens substrate that is positioned over the cross border area of iris and pupil of the eye. Component 802 may be comprised of the same material as the rest of the contact lens substrate. A power supply module 803, integrated into the contact lens, may be implemented as an RF antenna that derives electric power from a nearby source of RF radiation; alternatively, it can derive power from an onboard solar panel integrated into the contact lens, which is light sensitive and produces an electric current once exposed to daylight. Module 803 may also contain an electricity storage unit: a battery, a capacitor or an accumulator. Module 804 is a communication module that uses an RF antenna 805 to communicate with a service external to the contact lens, or with another contact lens. Module 803 may use antenna 805 to generate electric power for the needs of the lens. Electric control circuitry and the communication bus 806 are configured to connect a variety of the components of the contact lens and control communications between them, as well as, provide electric power to all electric or electro-optical components of the contact lens.

The component 808 is an electromagnetic radiation emitter, for example, an infrared (IR) emitter or near infrared. It is positioned, optionally, under the angle over the pupil of the eye and facing the cornea. The role of the IR emitter is to irradiate the crystalline lens of the eye with electromagnetic energy invisible to the retina, IR light has a longer wavelength than visible light and is invisible to the light-sensitive retina of the eye, and normally, will not engender pupillary response. Other bands of invisible light may be used to register the shape of the crystalline lens.

In one exemplary, non-limiting embodiment, an accommodation detection component 807 may comprise a variety of light sensor(s) 811; optionally, it may comprise a focusing lens 810.

The accommodation detection component 807 may comprise an eye-facing photo sensor, for example, a monochrome CCD or a CMOS sensor, configured to react to electromagnetic radiation of a wave range corresponding to the emitter's wave range, for example, IR wavelength. Components 807 and 808 are arranged to work together. The CCD sensor and IR emitter are configured to detect the shape of the crystalline lens. Infrared light may be focused by a focusing component 810 before it is registered by the photo sensor 811. The focusing component 810 may be implemented as a miniaturized Fresnel lens. The benefit of the Fresnel lens is the enablement of large aperture with a very short focal length, which is a requirement for the pupil-facing contact lens based sensor.

In one exemplary, non-limiting embodiment, accommodation detection may be achieved by measuring eccentric photo refraction level; that is level of aberration of light hitting the sensor. Point where aberration is minimal is the point of high focus.

In one exemplary, non-limiting embodiment, component 807 may comprise a number of similar or dissimilar types of light sensors.

In one exemplary, non-limiting embodiment, a sensor 811 may be implemented with an Active-pixel sensor (APS). CMOS type of sensors is a good example.

In one exemplary, non-limiting embodiment, a sensor 811 may be implemented as a monochrome CMOS sensor.

In one exemplary, non-limiting embodiment, a sensor 811 may be implemented with charge-coupled devices (CCD).

In one exemplary, non-limiting embodiment, a sensor 811 may be implemented with a variety of chemical detectors, such as photographic plates, where a silver halide molecule is split into an atom of metallic silver and a halogen atom.

In one exemplary, non-limiting embodiment, a crystalline lens accommodation detection component 807 may be implemented with a CCD sensor 811, which may be coupled with a focusing lens 810 that is arranged to focus the image of the crystalline lens onto the underlying CCD sensor 811.

An IR emitter is arranged to irradiate the crystalline lens. A photosensitive sensor is arranged and calibrated to detect the level of IR radiation reflected from the crystalline lens, and detect changes in the level of reflection of the crystalline lens.

When the IR emitter turns on irradiation, the CCD sensor also takes snapshot(s) of sensor array values, converting them to the voltage values, and eventually, into an image map.

In one exemplary, non-limiting embodiment, an eye-facing accommodation detection component 807 may determine and track the shape of the crystalline lens by making a series of snapshots, or engaging in a continuous observation of the lens. The shape of the lens is detected and the associated accommodation is computed. The system hereby proposed, enables monitoring of the shape of the crystalline lens and determining the level of accommodation reflex taking place.

Figure 8:
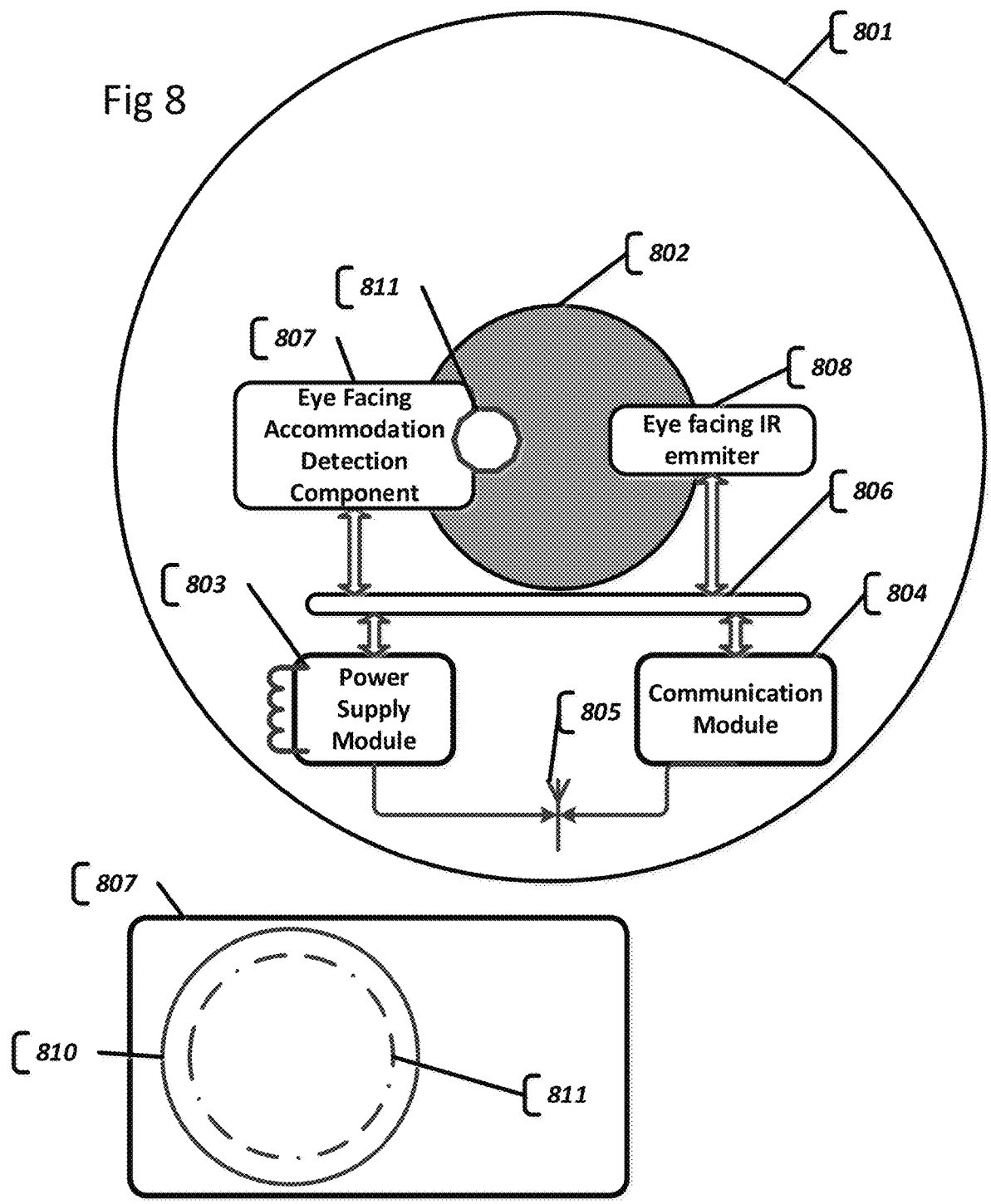
FIG. 8 is schematic drawing of an active contact lens with accommodation reflex measuring rear facing electromagnetic sensor coupled to an IR emitter, in light of present invention.

In one exemplary, non-limiting embodiment, the system of FIG. 8, may be arranged to determine the shape of the crystalline lens directly.

In one exemplary, non-limiting embodiment, the system of FIG. 8, may be implemented as an objective optometer, and more specifically, as an objective infrared optometer. Such an optometer uses optical principles of eccentric photo refraction to compute the refractive qualities, and therefore, the form of the crystalline lens.

The device hereby proposed may constitute the accommodation reflex module. The system is arranged to determine how much of the pupil dilation is attributable to the accommodation given a particular change in the lens shape. Pupil dilation attributable to accommodation is then subtracted from the total pupil dilation.

Figure 11:
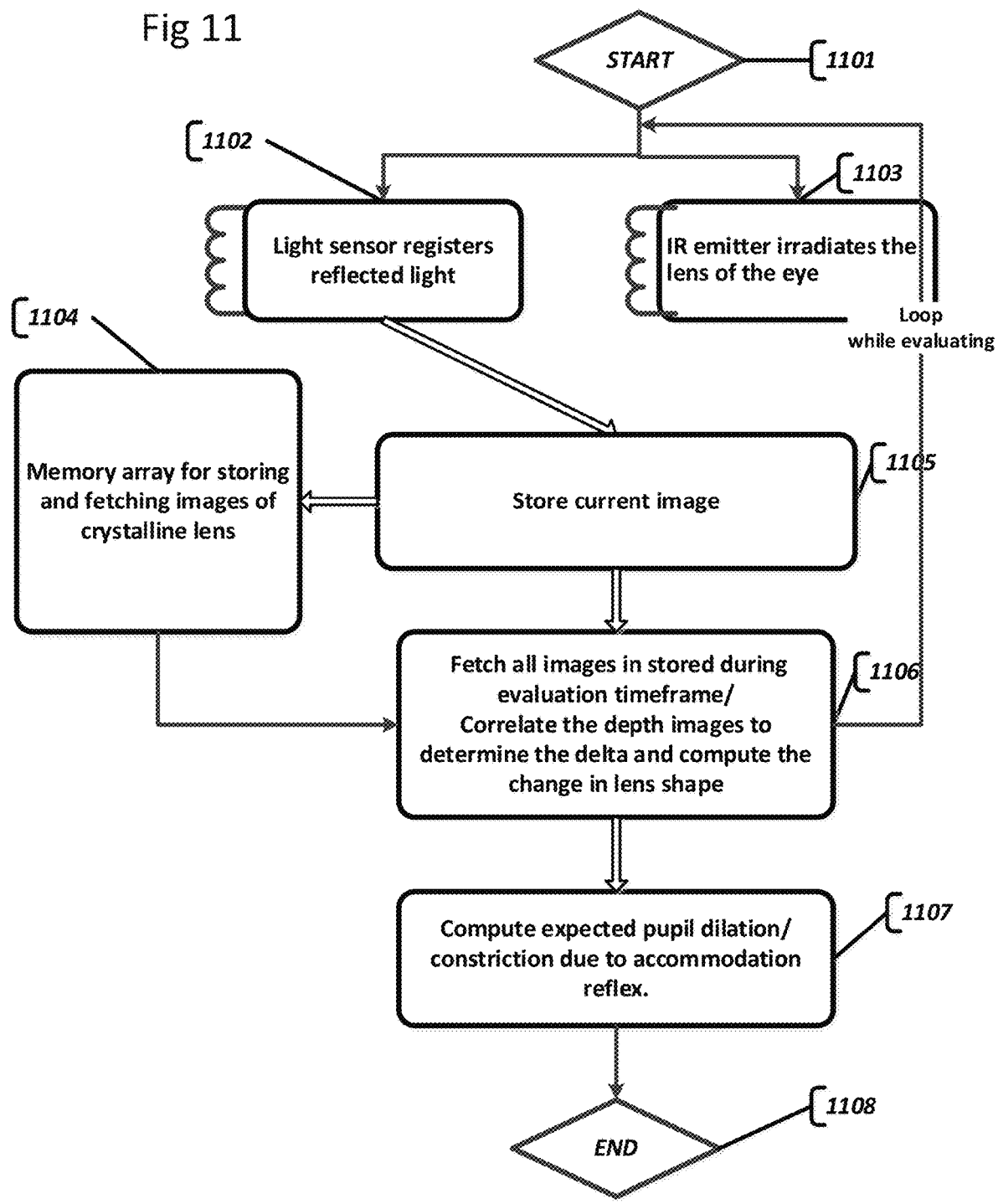
FIG. 11 is a process flow diagram depicting a process of active contact lens with determining expected pupil dilation based on changes in the shape of the crystalline lens, in light of present invention.

FIG. 11 depicts the process flow of the sub system, which determines the accommodation reflex by measuring and tracking the changes in the crystalline lens. The process starts at step 1101. It may be triggered by the need of the system to take a measurement of the accommodation reflex. The system starts measuring the shape of the crystalline lens in a loop, At step 1103, an IR emitter irradiates the crystalline lens of the eye with invisible light. At step 1102, the image sensor is arranged to be photosensitive to the same bandwidth of light that the emitter produces.

In one exemplary, non-limiting embodiment, the system is arranged to take snapshots of the depth images of the crystalline lens at predefined short time intervals. At step 1105, the system reads out an image from the image sensor and stores the image into the memory 1104.

Furthermore, at step 1106 the system fetches a series of depth images and correlates them to determine the extent of the change in the shape of the lens. The system fetches all stored images that were stored during the evaluation timeframe. Then, the system correlates the depth images to determine the extent of change in the shape of the lens.

Further, at step 1107 the system computes the expected pupil dilation or constriction due to accommodation. In one exemplary, non-limiting embodiment, the system assumes a constant ambient light background. Changes in ambient light are accounted for by the pupillary reflex monitoring mechanisms.

In one exemplary, non-limiting embodiment, the systems may have a predefined and pre-stored index of pupil dilation in connection with the level of convexity of the crystalline lens under a certain predefined intensity of ambient light. The index may be generated during a calibration exercise, and it may also contain the associated intensity of the ambient light.

The process stops at step 1108 when the system stops the evaluation process.

In one exemplary, non-limiting embodiment, the system may comprise a contact lens substrate 901, where 902 designates a section of the contact lens substrate that is positioned over the cross border area of the iris and the pupil of the eye. Section 902 may be comprised of the same material as the rest of the contact lens substrate. A power supply module 903, integrated into the contact lens, may be implemented as an RF antenna that may derive electric power from a nearby source of RF radiation. Alternatively, it can derive power from an onboard solar panel, embedded into the contact lens, which is light sensitive and produces an electric current once exposed to daylight. Module 903 may also contain an electricity storage unit: a battery, a capacitor or an accumulator. Module 904 is a communication module that uses an RF antenna 905 or another RF antenna, to communicate with a service external to the contact lens, or with another contact lens. Module 903 may use antenna 905 to generate electric power for the needs of the lens. Electric control circuitry and communication bus 906 are configured to connect a variety of the components of the contact lens and control communication between them, as well as, provide electric power to all electric or electro-optical components of the contact lens.

In one exemplary, non-limiting embodiment, a component 908 is an electromagnetic radiation emitter 901, such as infrared (IR) emitter or near infrared, which is integrated into the contact lens substrate. IR light has a longer wavelength than visible light and is invisible to the light-sensitive retina of the eye, and normally, will not engender pupillary response.

In one exemplary, non-limiting embodiment, a component 908 may be disposed on the wearable device other than the contact lens, for example, on wearable smart glasses.

The role of the IR emitter is to irradiate the environment of the observer with electromagnetic energy invisible to the retina.

In one exemplary, non-limiting embodiment, accommodation detection may be achieved with an outer-facing depth image component 907, which may comprise a variety of light sensor(s) 911. Optionally, it may comprise a focusing lens 910.

An outer-facing depth image component 907 may comprise an outer-oriented photo sensor, for example, a monochrome CCD or a CMOS sensor configured to react to electromagnetic radiation of the wave range corresponding to the emitter's wave range, for example, IR wavelength. Components 907 and 908 are arranged to work together. The CCD sensor and the IR emitter are configured to take a depth image that represents a depth map. In a depth, map each pixel registers the amount of infrared light that comes back to the photo sensor. Each pixel connotes how far from or how close to the observed object the photo sensor is. Infrared light may be focused by a focusing component 910, before a photo sensor 911 registers it. A focusing component 910 may be implemented as a miniaturized Fresnel lens. The benefit of the Fresnel lens is the enablement of large aperture with a very short focal length. The Fresnel lens needs to be specially calibrated and adjusted to focus IR wavelength radiation to avoid aberration.

The system may be arranged to recognize objects and their shapes from the depth image and determine the distance to objects being looked at by the user.

In one exemplary, non-limiting embodiment, the system is arranged to determine the distance to the object(s) or part of the object at the center of the focused image. The reason for that is because the visual angle for a human eye is up to two degrees of visual field for focused perception. The eye focuses on the object that is at the center of the visual field. Provided that the depth sensor is arranged on the contact lens to be parallel to the crystalline lens of the eye, the center of the depth image would represent the point of focus. Therefore, a change in depth of the object in focus over a short period of time is indicative and predictive of the extent of the accommodation reflex taking place.

Once the change in distance to the object looked at by the user is determined, it is possible to determine the corresponding extent of the accommodation reflex.

At the time of this writing there exists an application called Microsoft Kinect based on similar technology, comprising a dual sensor technology developed by the Israeli company PrimeSense, where two CMOS sensors are used. One CMOS photo sensor is a color sensor and the second sensor is a monochrome CMOS sensor coupled with an IR emitter. The monochrome CMOS sensor registers depth image, also known as, a depth map. The actual application of Microsoft Kinect is gaming, where applications react to a change in depth of the subject being tracked; for example, the movement of the hands of the subject is tracked, and applications may react to it.

In one exemplary, non-limiting embodiment, component 907 may comprise a number of similar or dissimilar types of light sensors.

In one exemplary, non-limiting embodiment, a sensor 911 may be implemented with an Active-pixel sensor (APS). CMOS type of sensor is a good example.

In one exemplary, non-limiting embodiment, a sensor 911 may be implemented as a monochrome CMOS sensor.

In one exemplary, non-limiting embodiment, a sensor 911 may be implemented with charge-coupled devices (CCD).

In one exemplary, non-limiting embodiment, a sensor 911 may be implemented with a variety of chemical detectors, such as photographic plates, where a silver halide molecule is split into an atom of metallic silver and a halogen atom.

In one exemplary, non-limiting embodiment, a crystalline lens accommodation detection component 907 may be implemented with a depth sensor 911 that may be coupled with a focusing lens 910, arranged to focus an image of the environment in front of the eye onto the underlying depth sensor 911.

The IR emitter is arranged to irradiate the environment in front of the eye and a photosensitive sensor is arranged and calibrated to detect the level of IR radiation, reflected from the environment in front of the subject wearing the lens. When the IR emitter turns on irradiation, the CCD sensor also takes snapshot(s) of sensor array values, converting them to the voltage values, and eventually, into an image map.

In one exemplary, non-limiting embodiment, an outer-facing accommodation detection component 907 may determine what the subject is looking at, and by analyzing the depth image, determine the depth of the object(s) looked at by the eye. The distance to the object looked at is correlative with and indicative of the accommodation reflex.

In one exemplary, non-limiting embodiment, a crystalline lens accommodation detection component 907 may be implemented with a range sensor that measures distance to the object directly in front. In this case, no focusing lens is required.

In one exemplary, non-limiting embodiment, a range finder may be implemented as a laser range scanner In one exemplary, non-limiting embodiment, a range finder may be implemented as an ultrasonic transducer In one exemplary, non-limiting embodiment, a range finder may be implemented as a radar, where component 907 is configured to function as a radar receiver of electromagnetic waves of a certain electromagnetic spectrum, while component 908 is configured to function as a radar transmitter, emitting electromagnetic energy in the same electromagnetic spectrum.

In one exemplary, non-limiting embodiment, component 912 is a processing module, responsible for the analysis and computation of the output of the depth map component 907. The processing component 912 may be configured to determine the approximate distance to the object in focus. The processing component 912 may track changes in distance corresponding to the object(s) in focus of the eye. The processing component may compute the extent of the accommodation reflex.

In one exemplary, non-limiting embodiment, component 912 is a processing module, which may function as part of a rangefinder/radar sub-system, where the change of the object's distance, as registered by the radar receiver component 907, is tracked and the distance is computed. The processing component 912 may track changes in distance corresponding to the object(s) in focus of the eye. The processing component may compute the extent of the accommodation reflex.

The device hereby proposed may constitute the accommodation reflex module. The system is arranged to determine how much of the pupil dilation is attributable to the accommodation, given a particular change in the lens shape. Pupil dilation, attributable to accommodation, is subtracted from the total pupil dilation.

Figure 9:
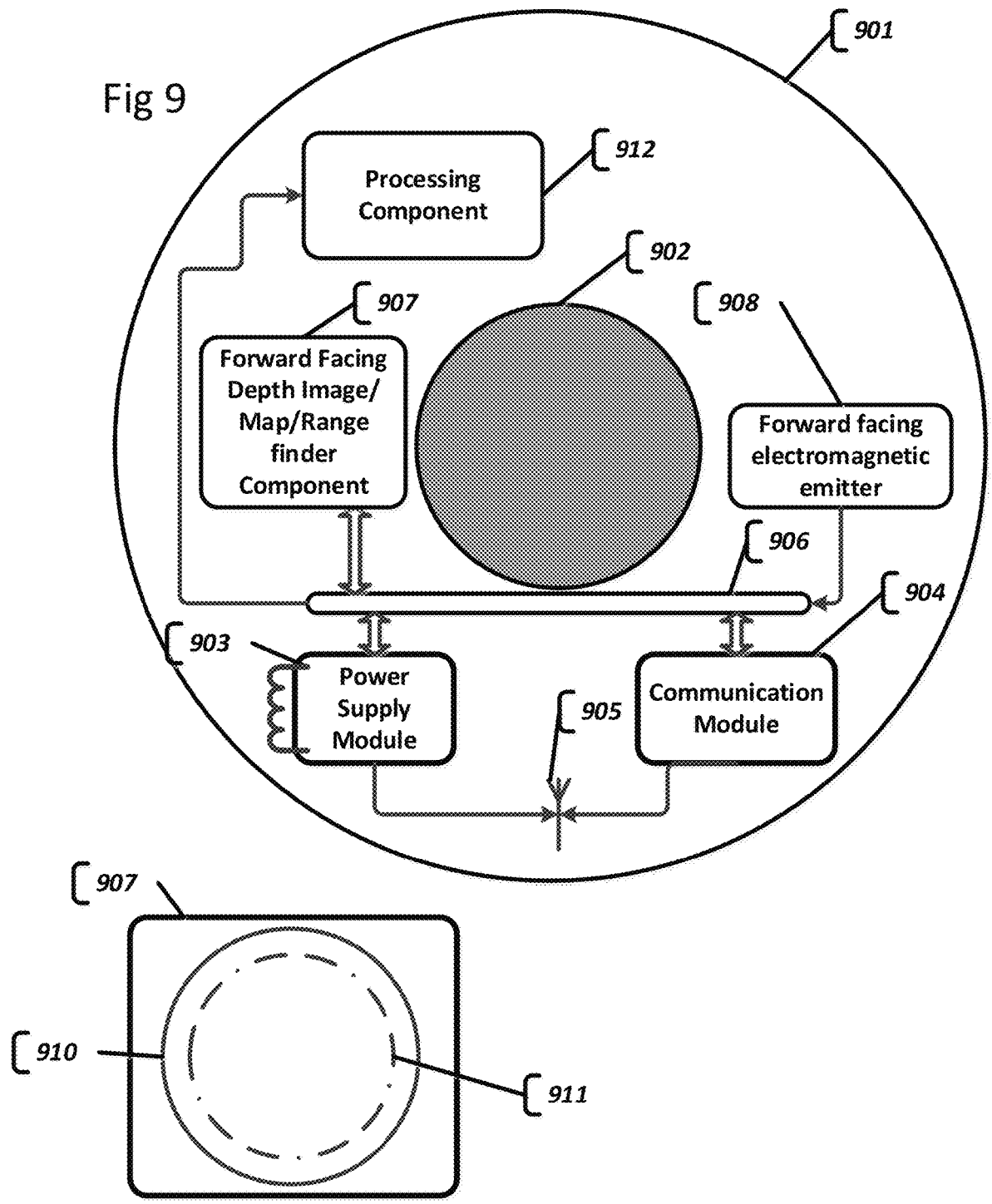
FIG. 9 is a schematic drawing of an active contact lens with accommodation reflex measuring forward facing depth sensor or range finder sensor coupled with an emitter of electromagnetic energy, in light of present invention.
Figure 10:
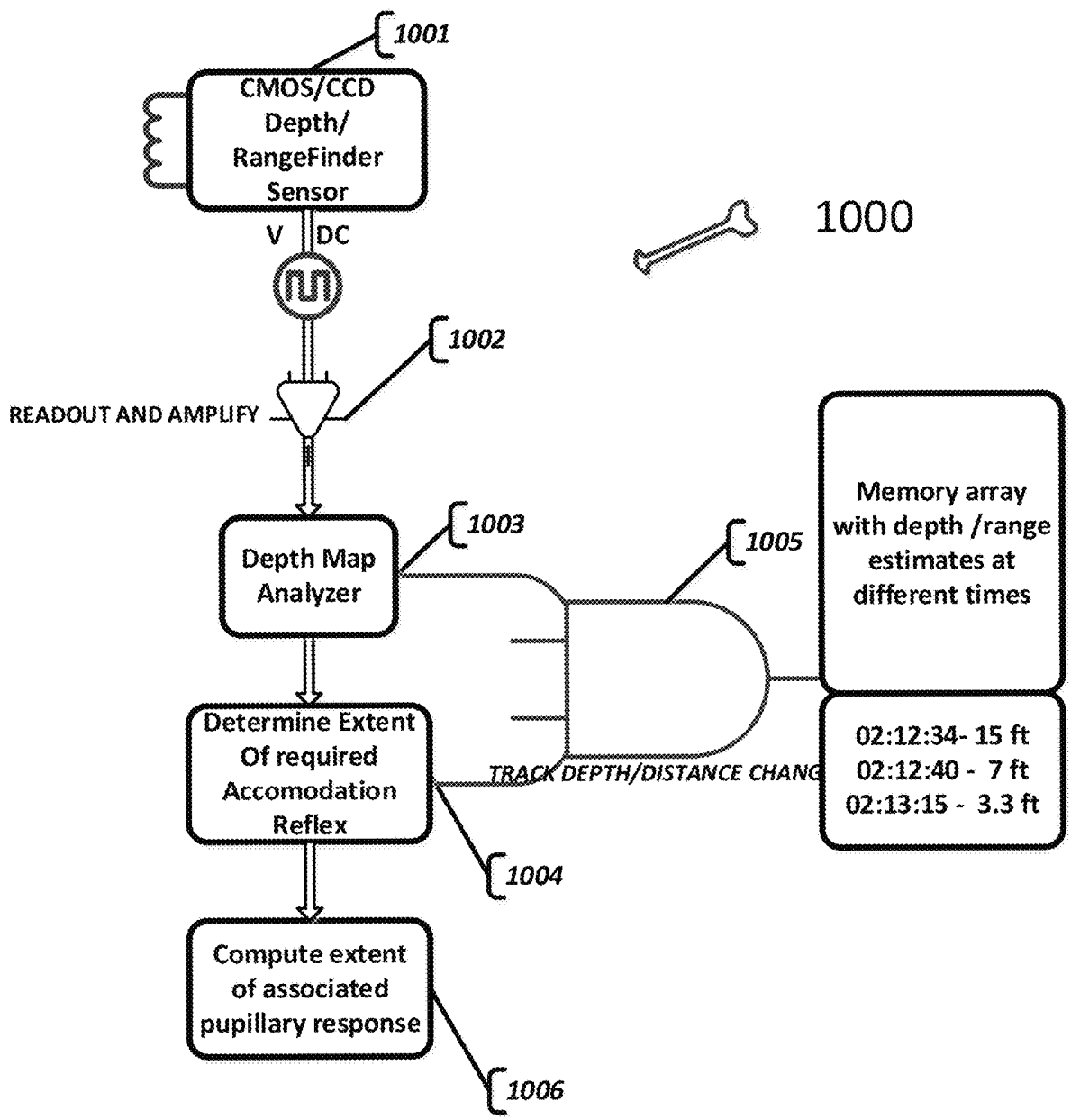
FIG. 10 is a process flow diagram depicting a process of accommodation reflex tracking component, in light of present invention.

Furthermore, FIG. 10 depicts the process flow of the system depicted in FIG. 9. The process starts at step 1001, where a photo sensor, reactive to an IR emitter, takes a snapshot, followed by readout and amplification at step 1002. At step 1002, each pixel's voltage values of the photosensitive sensor array are read into memory for analysis. On the readout, the level of signal per each pixel is optionally amplified.

Furthermore, at step 1003, the depth image is converted into a distance per each pixel. Further, the image may be analyzed for object and shape recognition. Distance values of the object in focus are determined.

Step 1004 determines the extent of the accommodation reflex by tracking the delta in the distance of the object being observed at step 1005. The tracking of distance is time-constrained and the duration and frequency of the tracking depend on the specifics of the application. The accommodation reflex works at different distances differently. It is more pronounced for refocus at shorter distances, whereas at bigger distances, the accommodation the effect is smaller.

In one exemplary, non-limiting embodiment, the index of correlation of the accommodation effect and the distance of the object being focused on, may be pre-stored by the system, and may be factored into the computation of the required accommodation at step 1004. The index may be preprogrammed into the system, or the system may calibrate with user-specific accommodation reflex values during a special calibration exercise in the beginning of the device usage. Once the extent of required accommodation is established, at step 1006, the system computes the extent of an associated pupillary dilation.

In one exemplary, non-limiting embodiment, the accommodation effect may be measured by identifying and tracking changes in the relative angle between the two eyes. One of the aspects of the accommodation reflex during refocus is vergence. When refocusing on a nearby object after holding a focus on a distant object, both eyes move in the opposite directions towards each other (the right eye turns to the left and the left eye turns to the right), so as to point the fovea of both eyes on the same object. Convergence of both eyes will be accompanied by an increase in the convexity of the crystalline lens, as well as, pupil constriction to limit the amount of light reaching the retina of the eye. Conversely, when refocusing on a distant object after holding a focus on a nearby object, the two eyes diverge in order to point the fovea of both eyes on the same object. Divergence of both eyes will be accompanied by the flattening of the crystalline lens, as well as, pupil dilation to increase amount of light entering the eye. The correlation between pupil dilation/constriction due to refocus in every individual case may marginally differ due to a variety of reasons, such as due to differences in pupillary distance or individual physiology of the ocular system. At the beginning of use of the contact lens the system may need to be calibrated to learn individual specific expression of the accommodation reflex. Computing the expected pupil diameter change in the accommodation reflex is an easy task, provided the vergence is known and light conditions do not change. When vergence is also accompanied by a change in light conditions, the change in luminance needs to be taken into account as well.

Hence, we propose a system purported to compute expected change in pupil diameter due to the accommodation reflex based on the vergence detected.

Figure 12:
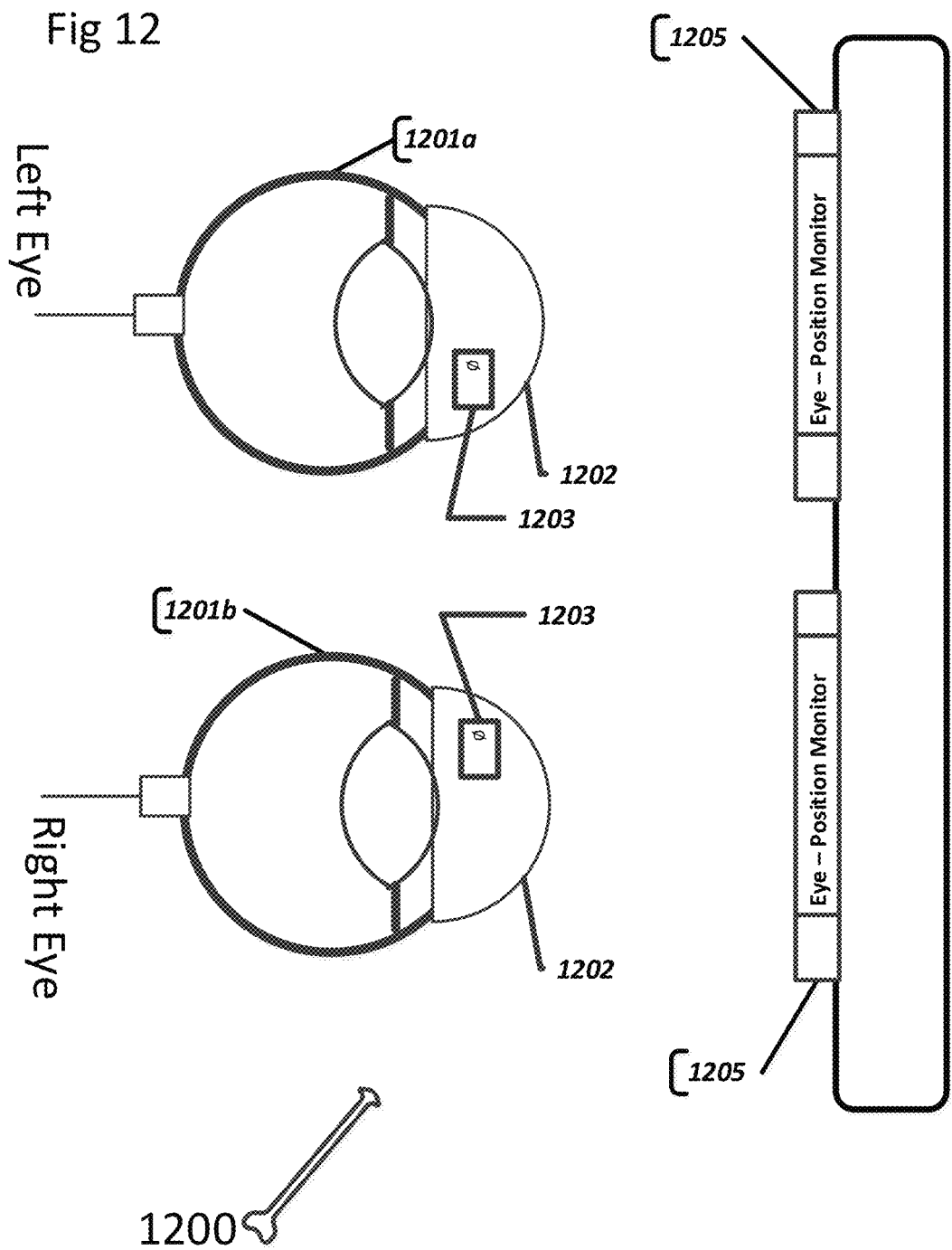
FIG. 12 is a schematic drawing of the two eye's with two active contact lens on. Each contact lens shows an embedded proximity sensor, in light of present invention.

In one exemplary, non-limiting embodiment, as per FIG. 12, the system 1200 hereby proposed, identifies and tracks changes in the orientation of each eye, and consequently, computes the change of relative angle and required accommodation taking place.

In one exemplary, non-limiting embodiment, the system 1200 monitors the movement of the left eye 1201*a* and the right eye 1201*b*. Monitoring may optionally be implemented by a variety of image capture devices 1205, deployed on the glasses of the user 1204. An image capture device may be implemented with a variety of known photo sensors arranged to react to visible light, for example, CMOS or CCD sensors. Alternatively, it may be implemented with IR or near IR sensors that may optionally be coupled with IR emitters. Other varieties of sensors are possible.

In one exemplary, non-limiting embodiment, the system 1200 monitors the movement of the left eye 1201*a* and the right eye 1201*b*. Monitoring may optionally be implemented by integrating at least one orientation sensor 1203 into the contact lens 1202. The onboard orientation sensors on each contact lens will determine directional orientation at any given time, and the processing module would track directional orientation change in the relative angle of each eye. Each contact lens may carry a communication module that enables the system to communicate orientation information from each eye to the processing/controlling unit.

In one exemplary, non-limiting embodiment, orientation sensors may comprise an accelerometer, a gyroscope, a magnetometer (electronic compass), a geomagnetic sensor and other variety of sensors capable of identifying absolute or relative orientation of the device. Good examples of such sensors are Bosch Sensortec sensors. Orientation sensors may be implemented as micro MEMS, MST or nano NEMS sensors. An orientation sensor may orient in multiple dimensions. For example, an orientation sensor may orient 2 axially, 3 axially, 6 axially, 9 axially, or in any other number of dimensions.

In one exemplary, non-limiting embodiment, once orientation of each eye is determined, changes in orientation can be tracked over periods of time. Snapshots of orientation at predefined periods of time may be taken and stored into memory. A processing module may process, in real-time, orientation changes of each eye and may compute the expected pupillary diameter change, based on the extent of accommodation detected.

In one exemplary, non-limiting embodiment, the system 1200 monitors the movement of the left eye 1201*a* and the right eye 1201*b*. Monitoring may optionally be implemented by integrating at least one proximity sensor 1203 into the contact lens 1202. Proximity sensors on each eye will determine and track how close or far the two eyes are to each other. The proximity sensors enable the system to compute the change in the angle of each eye vis-à-vis the other eye. Each contact lens may carry a communication module that enables the system to communicate orientation information from each eye to the processing/controlling unit.

As per drawing 14, a contact lens substrate 1401 incorporates a proximity sensor 1402. Information about the registered proximity of the sensor or a group of sensors on the sibling contact lens may be relayed utilizing communication module 1403.

In one exemplary, non-limiting embodiment, the system may incorporate multiple proximity sensors that will be disposed inside the lens substrate at various positions on the periphery of the contact lens substrate.

In one exemplary, non-limiting embodiment, proximity sensors may be implemented as magnetic sensors, inductive proximity sensors, capacitive sensors, or other types of sensors capable of determining the changes in distance between two objects. Proximity sensors may be implemented as micro MEMS, MST or nano NEMS sensors.

In one exemplary, non-limiting embodiment, a proximity sensor determines the distance between two eyes at any given time. An average pupillary distance, measured when the two eyes focus on a distant object and are aligned nearly parallel, is 62 mm for females and 65 mm for males. However, the actual pupillary distance varies significantly in different people and is heavily influenced by age and gender. Given that pupillary distance is known, the relative angle between the eyes, at any given time, may be computed based on the distance between the eyes derived from proximity sensors. Basic trigonometry functions may be used, or a multitude of other mathematical methods and models may be used to compute the extent of the convergence or divergence, as well as, the expected pupillary dilation or constriction due to the accommodation reflex taking place.

In one exemplary, non-limiting embodiment, when computing the relative angle between the eyes resulting from a change in eye proximity, information about eye circumference, the trajectory of eye movement, and associated proximity information obtained from proximity sensors, may be taken into consideration, as well as, the position of the proximity sensor on the contact lens substrate.

In one exemplary, non-limiting embodiment, the pupil dilation or constriction attributable to the accommodation reflex may be computed from the change in the eyes' angles.

A processing unit may be disposed on either the contact lens or any other device, such as smart glasses, cell phone, or some other smart device wirelessly connected to the contact lens. A processing component may be used to compute the relative angle changes between the eyes based on the output of the proximity sensors.

In one exemplary, non-limiting embodiment, proximity sensors may be used to determine the pupillary distance during a calibration exercise. The distance between proximity sensors can be derived by the contact lens system while the eyes are focused on a distant object and are aligned nearly parallel.

Figure 13:
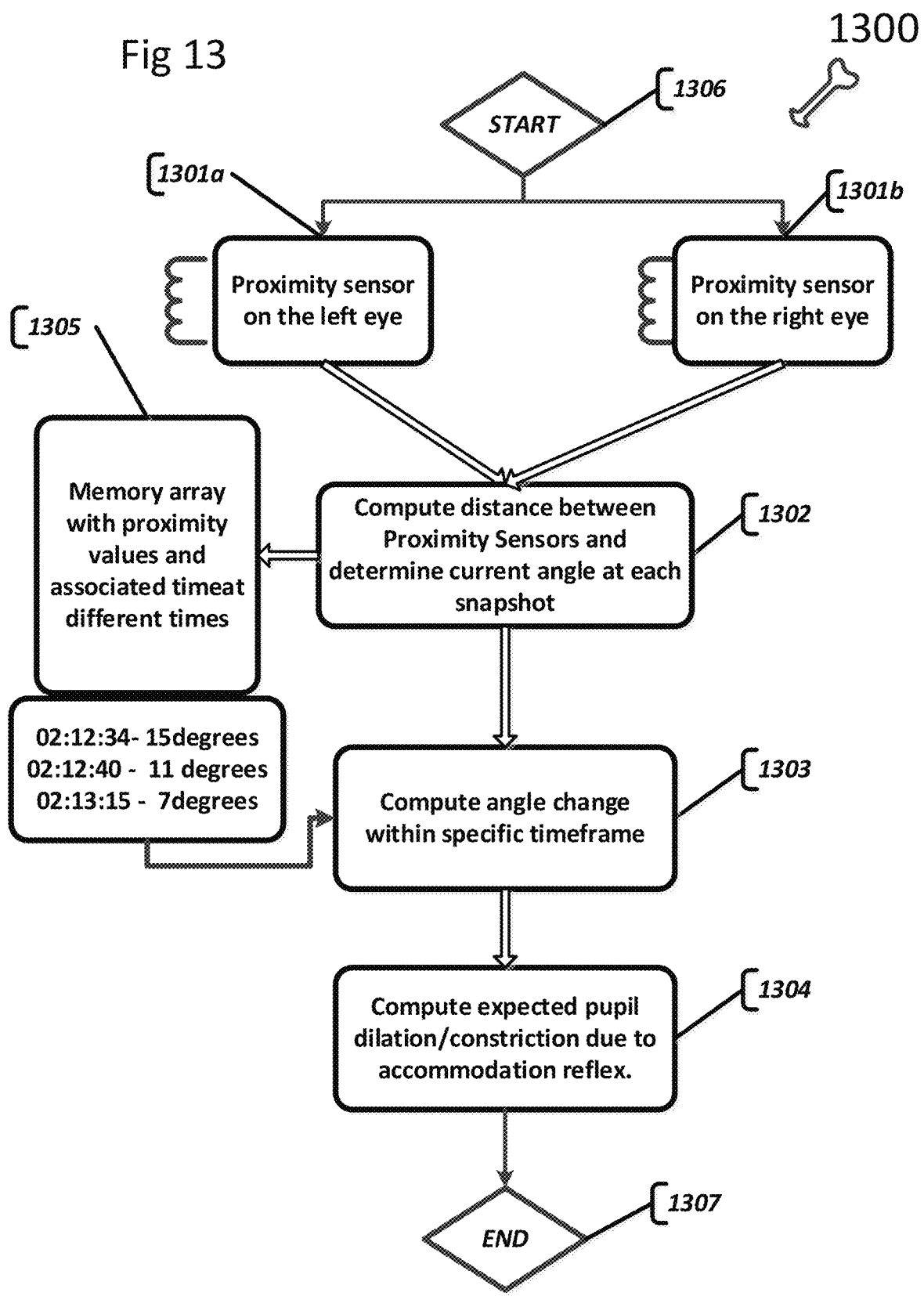
FIG. 13 is a process flow diagram depicting an a process of determining and tracking proximity or distance between the two eyes and determining expected pupillary response due to accommodation reflex, in light of present invention.
Figure 14:
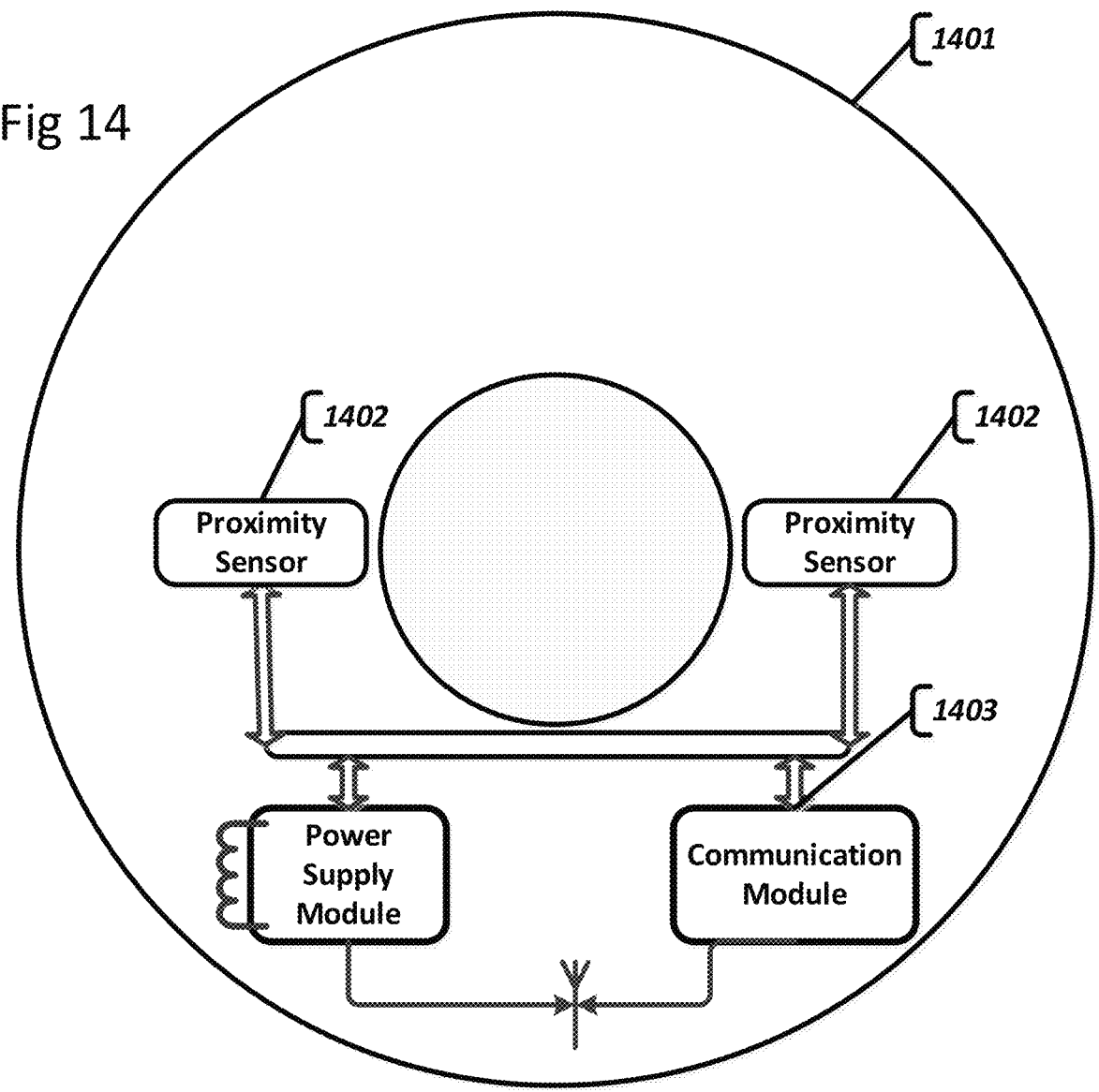
FIG. 14 is a schematic drawing of an active contact lens with an embedded proximity sensors, in light of present invention.

Furthermore, as per FIG. 13, the system flow is depicted. The process starts at 1306 step where the accommodation reflex starts to be measured. At step 1301(a) the proximity sensor determines the distance to the proximity sensor(s) on the right eye 1301(b). At step 1301(b) the proximity sensor determines the distance to the proximity sensor(s) on the left eye 1301(a). Determination is always relative to the other eye.

In one exemplary, non-limiting embodiment, there is one proximity sensor on each contact lens.

In one exemplary, non-limiting embodiment, the system may dispose the proximity sensor on the right side of the contact lens worn on the left eye, so that when the lens is worn on the eye, the proximity sensor is in its proper position. On the other hand, the proximity sensor may be disposed on the left side of the contact lens worn on the right eye. In such an implementation, the contact will be the farthest when the eyes are parallel. The distance would get shorter as the eyes converge.

In one exemplary, non-limiting embodiment, there are multiple proximity sensors on each contact lens. The sensors may be disposed on the contact lens around the perimeter of the contact lens, or closer to the center, or both.

In one exemplary, non-limiting embodiment, the system may arrange proximity sensors in pairs, where each pair consists of one proximity sensor disposed on the left eye, and one proximity sensor disposed on the right eye. Their paired estimations are mutual and relative to each other. There may be multiple pairs arranged in the system and their relative values may be averaged to obtain a better estimation.

In one exemplary, non-limiting embodiment, the system may arrange proximity sensors in one-to-many relationship, where each sensor on one eye determines proximity to all proximity sensors on the other eye. This can be done, for example, by measuring the average magnetic field from the other eye and its vector. In this embodiment, proximity sensor(s) may be implemented with a magnetic element and a magnetic field reader. A proximity sensor may carry both a magnetizing component and a reader of the magnetic field.

In current implementation, a general level of magnetic field may be evaluated by each magnetic reader.

At step 1302 the actual distance is computed and stored into memory at step 1305 for future processing. The system comprises memory that might be an onboard memory integrated into the contact lens, and optionally, integrated with an onboard processor module. It could also be arranged outside of the contact lens, and optionally integrated with a processor module, that is arranged outside of the contact lens. At step 1302 the system also computes the current angle of convergence between the eyes and stores current eye positional information into the memory.

At step 1303, the system computes the change of angle between the eyes based on the output of the proximity sensors over time. Here, a set of snapshot angle or distance values, stored in memory, is fetched and the extent of accommodation change is computed as a delta of original angle value and latest angle value.

At step 1304, the system computes expected pupil dilation or constriction due to the accommodation reflex. The system may use the index of dilation/constriction values derived during the calibration exercise, or alternatively, the system may be provided with a pre-stored index of proper aperture values for pupil diameter at different accommodation levels.

Different levels of lighting affect the need to change the aperture of the eye, and therefore, change the pupil diameter. At different levels of ambient light, the dilation required is different. Ideally, the contact lens system also tracks light level changes and together with the accommodation reflex tracker, the estimation of expected pupillary dilation/constriction will be accurate.

Process ends at step 1307, where the pupil dilation due to accommodation is computed and is made available to the system.

It is to be understood that the all above descriptions and embodiments are intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from the spirit of the invention and its scope. Many other embodiments will be apparent to those of skill in the art upon reviewing the above description. The scope of the subject matter disclosed herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. This written description uses examples to disclose the various embodiments of the subject matter disclosed herein, including the best mode, and also to enable any person skilled in the art to practice the various embodiments of the subject matter disclosed herein, including making and using any devices or systems and performing any incorporated methods. The patentable scope of the various embodiments of the subject matter disclosed herein is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed:

1. An active contact lens system comprising:
    Contact lens substrate,
    An integrated electric circuit that connects all integrated, into the said contact lens, electronic components,
    An integrated power supply module providing electric power via said electric circuit to all constituent-components of the said active contact lens,
    An integrated light sensor configured to register light intensity,
    A miniatuarized focusing lens, operatively coupled with the said integrated light sensor and positioned in front of the said light sensor and arranged to focus incident light onto the said integrated light sensor,
    A processor configured to determine the vector(s) of incident light.

2. An active contact lens system comprising:
    Contact lens substrate,
    An integrated electric circuit that connects all integrated, into the said active contact lens, electronic components, An integrated power supply module providing electric power via said electric circuit to all constituent-components of the said active contact lens, At least two integrated light sensors arranged to register intensity of incident light, A processor configured to determine the vector(s) of incident light, based on light intensity registered by each integrated light sensor taking into consideration location of each sensor on the said active contact lens.

3. An active contact lens system of claims 1 or 2 comprising:

An integrated one or more light restricting materials disposed on or within one or more areas of the substrate, where light restricting material forms multi section device, where each section of the device is controllable electronically, An integrated, into contact lens substrate, light dimming control unit coupled with the light dimming control unit and light sensor component, the light dimming control unit is further configured to:

Determine and track changes in the amount of ambient light, vector of light incidence of light, Determine level of dimming that needs to be applied to keep amount of light reaching the retina of an eye constant over period of time, Determine section(s) of the light dimming control unit that correspond to the incident light of greatest intensity and compute level of dimming required for section affected, Adjust respective sections of light dimming unit to dim incident light.

4. An active contact lens system comprising:

Contact lens substrate,

An integrated electric circuit that connects all integrated, into the said active contact lens, electronic components, An integrated power supply module providing electric power via said integrated electric circuit to all constituent components of the said active contact lens, A rear facing crystalline lens shape detecting image sensor, reactive to invisible light, coupled with rear facing electromagnetic emitter of invisible light: infra red (IR) or ultraviolet light (UV) or other type of invisible light, wherein the said rear facing electromagnetic emitter of invisible light, arranged to irradiate crystalline lens of an eye, whereas the said crystalline lens shape detecting image sensor registers invisible light reflected by crystalline lens, A processor configured to identify the shape of the crystalline lens and track lens's shape changes or to detect the level of the aberration at present level of focal depth of crystalline lens and track change in aberration of crystalline lens.

5. An active contact lens system comprising:

Contact lens substrate,

An integrated electric circuit that connects all integrated, into the said active contact lens, electronic components, An integrated power supply module providing electric power via said integrated electric circuit to all constituent components of the said active contact lens, An integrated forward facing image sensor, arranged to be reactive to electromagnetic radiation of invisible light coupled with the electromagnetic radiator of invisible light: Infra Red (IR) or Ultraviolet Light (UV) emitter, or other type of invisible light emitter, further coupled with a processor arranged to compute depth image, where depth image represents spatial information, An integrated focusing lens component positioned in front of the said integrated forward facing sensor.

6. An active contact lens system comprising:

Contact lens substrate,

An integrated electric circuit that connects all integrated, into the said active contact lens, electronic components, An integrated power supply module providing electric power via said integrated electric circuit to all constituent-components of the said active contact lens, At least one rear facing dilation sensor configured to determine level of pupil dilation, An integrated light sensor configured to determine amount of ambient light in an environment, An integrated processor configured to determine extent of pupil dilation attributable to pupillary reflex.

7. An active contact lens system comprising:

Contact lens substrate,

An integrated electric circuit that connects all integrated, into the said active contact lens, electronic components, An integrated power supply module providing electric power via said electric circuit to all constituent-components of the said active contact lens, Accommodation reflex determination component, configured to determine extent of accommodation, wherein accommodation reflex determination component comprises:

at least one orientation sensor configured to track directional changes in an eye or at least one proximity sensor configured to track distance between two active contact lens, wherein each active contact lens is worn on one eye of a user or embedded infrared optometer or, rear facing image sensor coupled with an integrated focusing lens, positioned in front of the said sensor and coupled with emitter of invisible light and configured to determine or track the shape of the crystalline lens of the eye, configured to determine extent of refocus, processor configured to determine extent of pupil dilation attributable to accommodation reflex.

8. An active contact lens system of claim 6 or claim 7 comprising:

At least one rear facing dilation sensor configured to determine level pupil dilation, The said processor configured to compute TERP.

9. An active contact lens system comprising:

Contact lens substrate,

An integrated electric circuit that connects all integrated, into the said active contact lens, electronic components, An integrated power supply module providing electric power via said integrated electric circuit to all constituent-components of the said active contact lens, An accommodation reflex determination component, configured to determine extent of accommodation, wherein accommodation reflex determination component comprises:

at least one orientation sensor configured to track directional changes in the eye or at least one proximity sensor configured to track distance between two contact lens, wherein each active contact lens is worn on one eye of a user or embedded infrared optometer or rear facing image sensor coupled with an integrated focusing lens, positioned in front of the said sensor and coupled with emitter of invisible light and configured to determine or track the shape of the crystalline lens of the eye, coupled with a processor and configured to calibrate the system for an individual user,
where the correlation of the eye refocus and pupil dilation is determined at different levels of refocus resulting pupillary responses are measured and correlations are stored for the future use by the system.

10. An active contact lens system comprising:
Two active contact lenses each comprising:
Contact lens substrate,
An integrated electric circuit that connects all integrated, into the said active contact lens, electronic components,
An integrated power supply module providing electric power via said integrated electric circuit to all constituent-components of the said active contact lens,
An integrated, into the said active contact lens substrate, at least one, proximity sensor, coupled with
a processor module, configured to determine extent of eye divergence or convergence.

11. A method for an active contact lens system comprising:
Contact lens substrate,
An integrated electric circuit that connects all integrated, into the said active contact lens, electronic components,
An integrated power supply module providing electric power via said integrated electric circuit to all constituent-components of the said active contact lens,
An integrated light sensor configured to register light intensity,
A miniaturized focusing lens, operatively coupled with the said integrated light sensor and positioned in front of the said light sensor and arranged to focus incident light onto the said integrated light sensor,
A processor configured to determine the vector(s) of incident light.

12. A method for an active contact lens system comprising:
Contact lens substrate,
An integrated electric circuit that connects all integrated, into the said active contact lens, electronic components,
An integrated power supply module providing electric power via said integrated electric circuit to all constituent-components of the said active contact lens,
At least two integrated light sensors arranged to register intensity of incident light,
A processor configured to determine the vector(s) of incident light, based on light intensity registered by each integrated light sensor taking into consideration location of each sensor on the said contact lens.

13. A method for an active contact lens system of claims 11 or 12 comprising:
An integrated one or more light restricting materials disposed on or within one or more areas of the substrate, where light restricting material forms multi section device, where each section of the device is controllable electronically,
An integrated, into contact lens substrate, light dimming control unit coupled with the light dimming control unit and light sensor component, the light dimming control unit is further configured to:
Determine and track changes in the amount of ambient light, vector of light incidence of light with luminosity above predefined threshold,
Determine level of dimming that needs to be applied to keep amount of light reaching the retina of an eye constant over period of time,
Determine section(s) of the light dimming control unit that correspond to the incident light of greatest intensity and compute level of dimming required for section affected,
Adjust respective sections of light dimming unit to dim incident light.

14. A method for an active contact lens system comprising:
Contact lens substrate,
An integrated electric circuit that connects all integrated, into the said active contact lens, electronic components,
An integrated power supply module providing electric power via said integrated electric circuit to all constituent-components of the said active contact lens,
A rear facing crystalline lens shape detecting, light reactive sensor coupled with rear facing electromagnetic emitter of invisible light: infra red (IR) or ultraviolet light (UV) or other type of invisible light arranged to irradiate crystalline lens,
A processor configured to identify the shape of the crystalline lens and track lens's shape changes or to detect the level of the aberration at present level of focal depth of crystalline lens and track change in aberration of crystalline lens.

15. A method for an active contact lens system comprising:
Contact lens substrate,
An integrated electric circuit that connects all integrated, into the said active contact lens, electronic components,
An integrated power supply module providing electric power via said integrated electric circuit to all constituent components of the said active contact lens,
An integrated forward facing image sensor, arranged to be reactive to electromagnetic radiation of invisible light coupled with the electromagnetic radiator of invisible light Infra Red (IR) or Ultraviolet Light (UV), or other type of invisible light emitter,
further coupled with a processor arranged to compute depth image,
where depth image represents spatial information,
An integrated focusing lens component positioned in front of the said forward facing image sensor.

16. A method for an active contact lens system comprising:
Contact lens substrate,
An integrated electric circuit that connects all integrated, into the said active contact lens, electronic components,
An integrated power supply module providing electric power via said integrated electric circuit to all constituent-components of the said active contact lens,
At least one rear facing dilation sensor configured to determine level of pupil dilation,
An integrated light sensor configured to determine amount of ambient light,
An integrated processor configured to determine extent of pupil dilation attributable to pupillary reflex.

17. A method for an active contact lens system comprising:
Contact lens substrate,
An integrated electric circuit that connects all integrated, into the said active contact lens, electronic components,
An integrated power supply module providing electric power via said integrated electric circuit to all constituent-components of the said active contact lens,
Accommodation reflex determination component, configured to determine extent of accommodation, wherein accommodation reflex determination component comprises:
at least one orientation sensor configured to track directional changes in an eye or
at least one proximity sensor configured to track distance between two contact lens, wherein each active contact lens is worn on one eye of a user or
embedded infrared optometer or
rear facing image sensor coupled with an integrated focusing lens, positioned in front of the said sensor and coupled with emitter of invisible light and configured to determine or track the shape of the crystalline lens of eye,
configured to determine extent of refocus,
processor configured to determine extent of pupil dilation attributable to accommodation reflex.

18. A method for an active contact lens system of claim 16 or claim 17 comprising:

At least one rear facing dilation sensor configured to determine level pupil dilation,
Processor configured to compute TERP.

19. A method for an active contact lens system comprising:
Two active contact lenses each comprising:
Contact lens substrate,
An integrated electric circuit that connects all integrated, into the said active contact lens, electronic components,
An integrated power supply module providing electric power via said integrated electric circuit to all constituent-components of the said active contact lens,
An integrated, into the said active contact lens substrate, at least one, proximity sensor, coupled with
a processor module, configured to determine extent of eye divergence or convergence.

* * * * *